US010696156B1

(12) United States Patent
Bennett

(10) Patent No.: US 10,696,156 B1
(45) Date of Patent: Jun. 30, 2020

(54) ASSEMBLY FOR MOUNTING DRIVE UNIT COMPONENTS IN A HOUSING

(71) Applicant: Hydro-Gear Limited Partnership, Sullivan, IL (US)

(72) Inventor: Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 288 days.

(21) Appl. No.: 15/910,685

(22) Filed: Mar. 2, 2018

Related U.S. Application Data

(63) Continuation of application No. 15/171,878, filed on Jun. 2, 2016, now Pat. No. 9,908,407, which is a continuation of application No. 13/450,238, filed on Apr. 18, 2012, now Pat. No. 9,358,879.

(60) Provisional application No. 61/476,650, filed on Apr. 18, 2011.

(51) Int. Cl.
  *B60K 17/10* (2006.01)
  *F16H 47/04* (2006.01)
  *F16H 39/10* (2006.01)

(52) U.S. Cl.
  CPC ........... *B60K 17/105* (2013.01); *F16H 39/10* (2013.01); *F16H 47/04* (2013.01)

(58) Field of Classification Search
  CPC .......... F16H 39/10; F16H 39/08; F16H 39/14; B60K 17/105; B60Y 2200/223
  See application file for complete search history.

(56) References Cited

U.S. PATENT DOCUMENTS

| | | | |
|---|---|---|---|
| 3,206,993 A | 9/1965 | Niemann | |
| 4,856,368 A * | 8/1989 | Fujisaki | B60K 17/105 74/606 R |
| 4,896,563 A | 1/1990 | Manor et al. | |
| 5,593,360 A | 1/1997 | Ishida et al. | |
| 5,697,264 A * | 12/1997 | Andrews | B60K 17/105 180/53.1 |
| 5,967,934 A | 10/1999 | Ishida et al. | |
| 6,062,361 A | 5/2000 | Showalter | |
| 6,178,746 B1 * | 1/2001 | Thoma | B60K 17/105 475/83 |
| 6,216,560 B1 * | 4/2001 | Takada | B60K 17/105 475/82 |

(Continued)

FOREIGN PATENT DOCUMENTS

CN 102801245 11/2012

OTHER PUBLICATIONS

U.S. Appl. No. 15/910,515, filed Mar. 2, 2018.

*Primary Examiner* — Abiy Teka
(74) *Attorney, Agent, or Firm* — Neal, Gerber & Eisenberg LLP

(57) ABSTRACT

A transaxle for a vehicle is provided, the transaxle having plurality of inward protrusions on an internal surface thereof. A motor block in the housing includes has one or more first depressions. At least one reduction gear assembly in the housing has one or more second depressions. At least one bearing in the housing for supporting an axle has one or more third depressions. The various inward protrusions on the internal surface of the housing interact with the one or more first depressions to retain the motor block in the housing, the one or more second depressions to retain the reduction gear assembly in the housing, and the one or more third depressions to retain the bearing in the housing.

20 Claims, 20 Drawing Sheets

(56) References Cited

U.S. PATENT DOCUMENTS 6,283,883 B1 9/2001 Hammarstrand
8,584,770 B2 11/2013 Zhang et al.

* cited by examiner

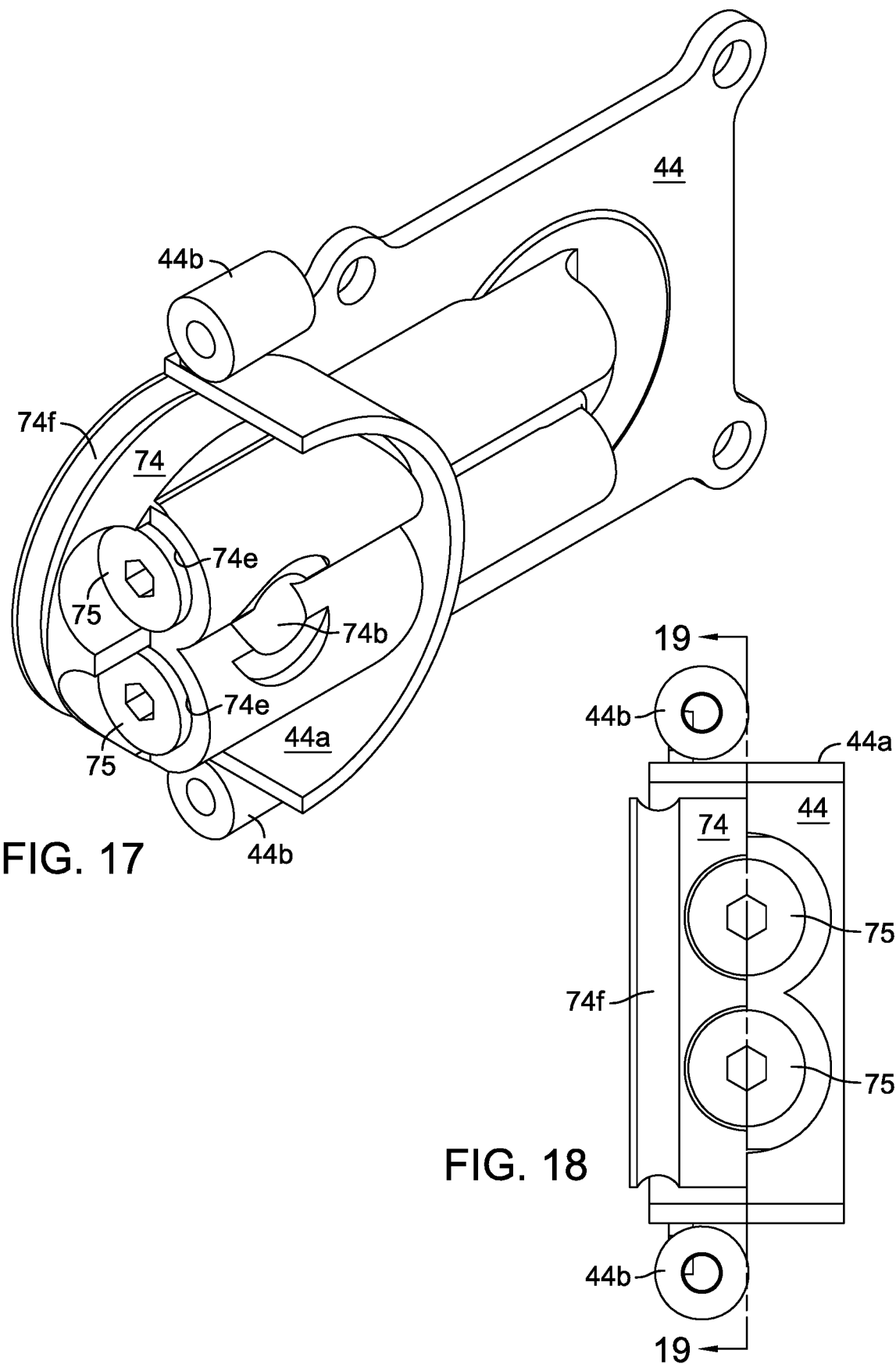

US 10,696,156 B1

ASSEMBLY FOR MOUNTING DRIVE UNIT COMPONENTS IN A HOUSING

CROSS-REFERENCE TO RELATED APPLICATIONS

This application is a continuation of U.S. patent application Ser. No. 15/171,878, filed on Jun. 2, 2016, which is a continuation of U.S. patent application Ser. No. 13/450,238, filed on Apr. 18, 2012, now U.S. Pat. No. 9,358,879, which claims the benefit of U.S. Provisional App. No. 61/476,650, filed on Apr. 18, 2011. The contents of these prior applications and patents are incorporated herein by reference in their entirety.

BACKGROUND OF THE INVENTION

This application relates to hydrostatic transaxles generally and, in particular, to transaxles intended for use in driving a vehicle, such as a rear engine riding lawn mower.

SUMMARY OF THE INVENTION

An improved hydrostatic transaxle is disclosed herein, as described in more detail below. The transaxle can be mounted on a vehicle or other powered machine or apparatus.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

FIG. 17 is a rotated perspective view of the pump end cap and motor port block of FIG. 16.

FIG. 18 is an elevational view of the pump end cap and motor port block of FIG. 17.

DETAILED DESCRIPTION OF THE DRAWINGS

Figure 1:
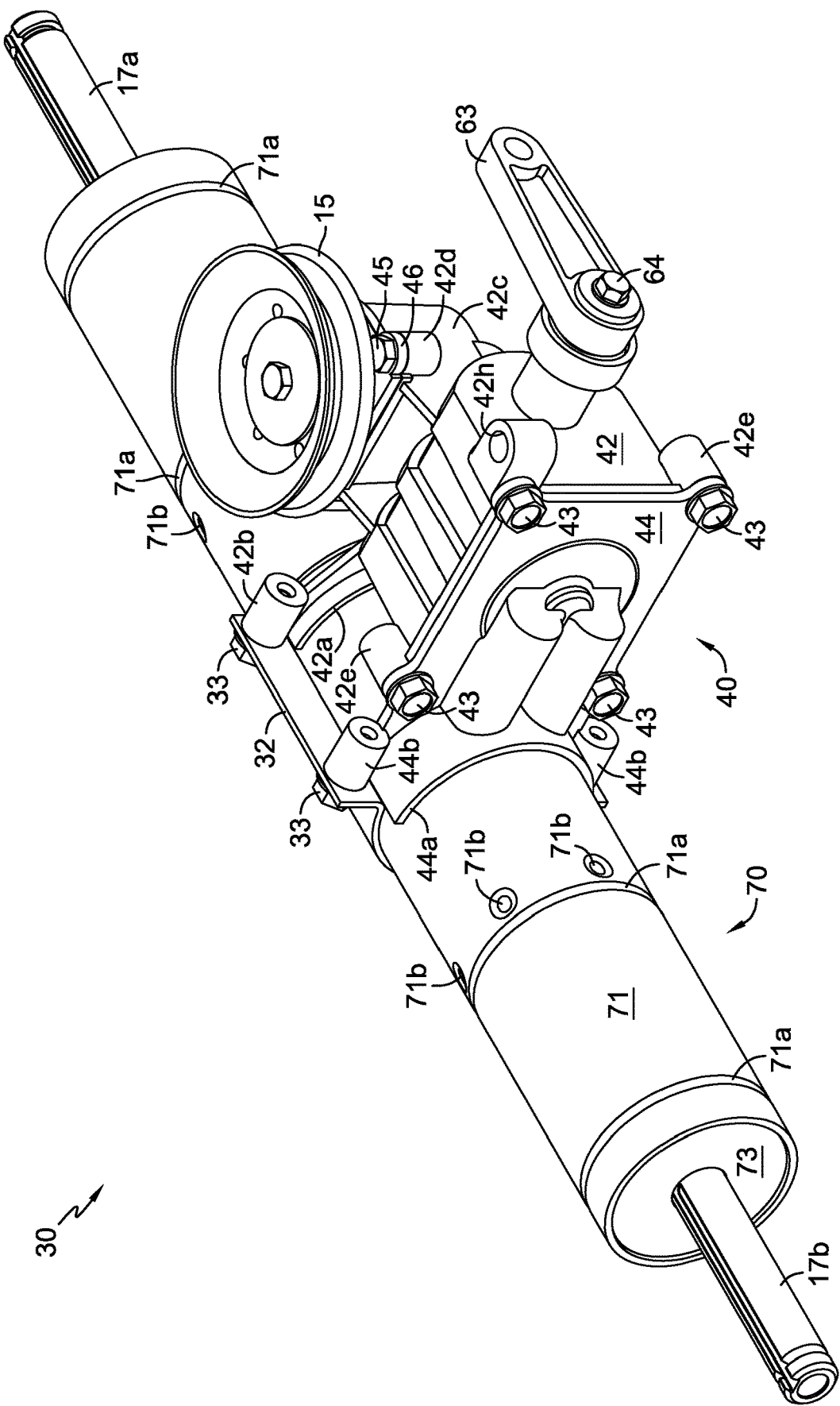
FIG. 1 is a perspective view of a first embodiment of a transaxle in accordance with the present invention.
Figure 2:
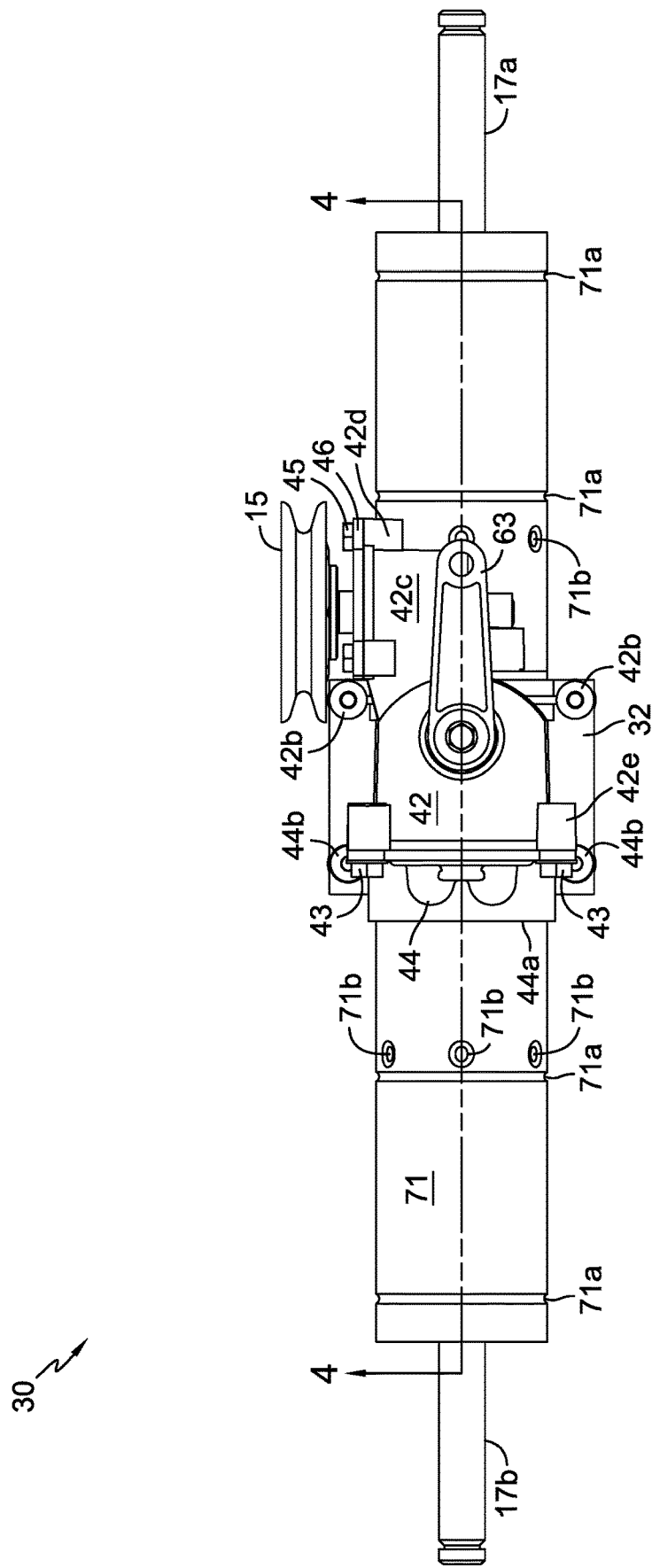
FIG. 2 is an elevational view of the transaxle of FIG. 1.

The description that follows describes, illustrates and exemplifies one or more embodiments of the present invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the present invention is intended to cover all such embodiments that may fall within the scope of the appended claims, either literally or under the doctrine of equivalents. For clarity, the various embodiments of transaxles illustrated and described in accordance with the principles of the present invention are referred to herein as transaxle "embodiments," while the various embodiments of vehicles incorporating certain of these transaxle assemblies are referred to herein as vehicle "configurations." Also for clarity, the vehicle configuration illustrations only depict certain vehicle elements that directly interface with their associated transaxle embodiments such as, for example, transaxle mounting accommodations, prime mover drive arrangements and vehicle wheels.

It should be noted that in the description and drawings, like or substantially similar elements may be labeled with the same reference numerals. However, sometimes these elements may be labeled with differing numbers or serial numbers in cases where such labeling facilitates a more clear description. For example, the pump housings in the three transaxle embodiments disclosed herein are serially numbered as 42, 142 and 242 respectively, to ease recognition. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art. Furthermore, as used herein, the terms "vertical" and "horizontal" are applied with respect to the ground or to the embodiments as illustrated and may be approximate. It will be further understood that for clarity in certain cross-sectional views, e.g., FIGS. 4, 7, 21 and 23, certain elements such as input shaft 34, pump shaft 49, pump input shafts 149 and 249, motor output shaft 79, axles 17a and 17b, and pulley 115, by way of example, are not shown in cross-section, as doing so would not assist in the understanding of the invention.

FIGS. 1-19 illustrate a first embodiment of a variable speed hydrostatic transaxle 30 in accordance with the principles of the invention. Transaxle 30 generally includes a pump assembly 40 coupled to and hydraulically driving a motor assembly 70. As depicted, pump assembly 40 contains a variable displacement axial piston pump 50, while motor assembly 70 contains a fixed displacement axial piston motor 80. The output shaft 79 of axial piston motor 80 extends from both ends of cylinder block 80b to drive both axles 17a, 17b of transaxle 30. In the illustrated embodiment, the axes of rotation of axles 17a, 17b and output shaft 79 are collinear.

Figure 3:
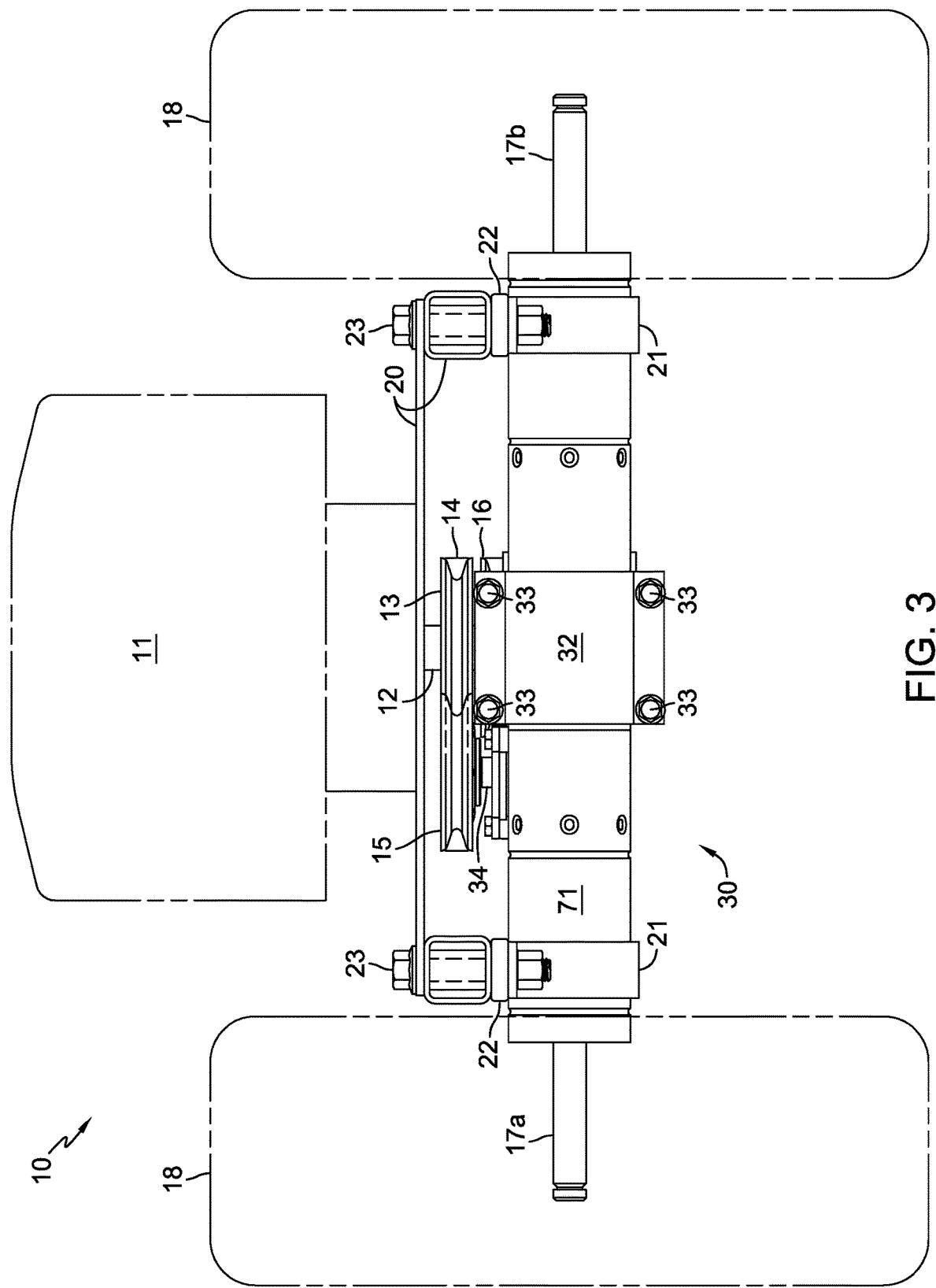
FIG. 3 is an elevational view of a first configuration of a vehicle incorporating the transaxle of FIG. 1.

A first configuration of an exemplary vehicle 10 incorporating transaxle 30 is illustrated in FIG. 3. Output shaft 12 of prime mover 11 extends through an opening in vehicle frame 20 to drive the input shaft 34 of transaxle 30. A pulley 13 attached to output shaft 12 and a horizontally oriented belt 14 cooperate to drive pulley 15 affixed to input shaft 34. As indicated, an auxiliary pulley 16 can also be driven by output shaft 12 to power a mowing deck (not shown) or other equipment (not shown) of vehicle 10. Prime mover 11 is generically illustrated in FIG. 3 and can be an internal combustion engine, an electric motor, or the like; and the pulley system shown to transfer power to transaxle 30 could be replaced with other known systems, such as a chain and cogs.

Input pulley 15, auxiliary pulley 16, and their respective drive belts can be selectively engaged or disengaged by various known means, such as a clutch or idler pulley (not shown), to thereby engage or disengage transaxle 30, a mowing deck, or other auxiliary equipment mounted on vehicle 10. Transaxle 30 is supported by a pair of generally U-shaped brackets 21, each attached to frame 20 by at least two bolts 23 or other suitable fasteners. As shown, vibration dampers 22 can be interposed between brackets 21 and frame 20, if desired, to improve ride characteristics of vehicle 10. Each of the axles 17a and 17b of transaxle 30 drives a wheel 18 of vehicle 10.

Pump assembly 40 is securely attached to motor assembly 70 by means of a plurality of screws 33 that attach tube bracket 32 to tube brackets 42a and 44a that are integrally formed on pump housing 42 and pump end cap 44, respectively. Pump end cap 44 acts as a hydraulic mounting member for pump assembly 40. Tube brackets 42a and 44a include bosses 42b and 44b, respectively, to receive screws 33 or other suitable fasteners, such as bolts or rivets, for example. At least one lug 42h or similar anchoring feature is provided on housing 42 to secure pump assembly 40 to a vehicle frame, for example, to prevent rotation of transaxle 30 about the axis of axle tube 71 and to minimize the effect of torque forces transferred through input pulley 15 when transaxle 30 is driven. Axle tube 71, which also acts as a motor housing for axial piston motor 80, has a generally cylindrical or tubular shape, and preferably a generally circular cross section.

Figure 5:
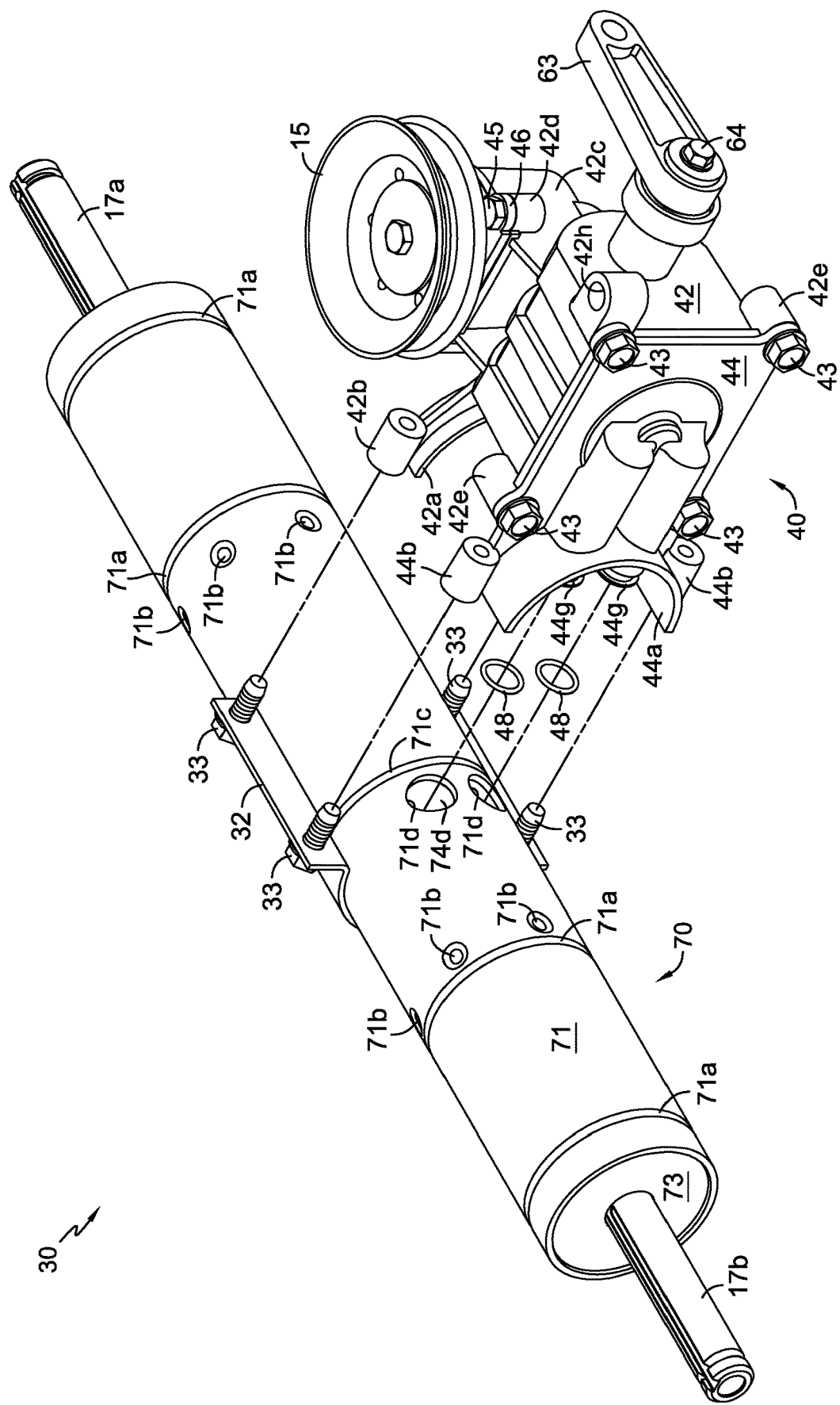
FIG. 5 is a partially exploded perspective view of the transaxle of FIG. 1.
Figure 6:
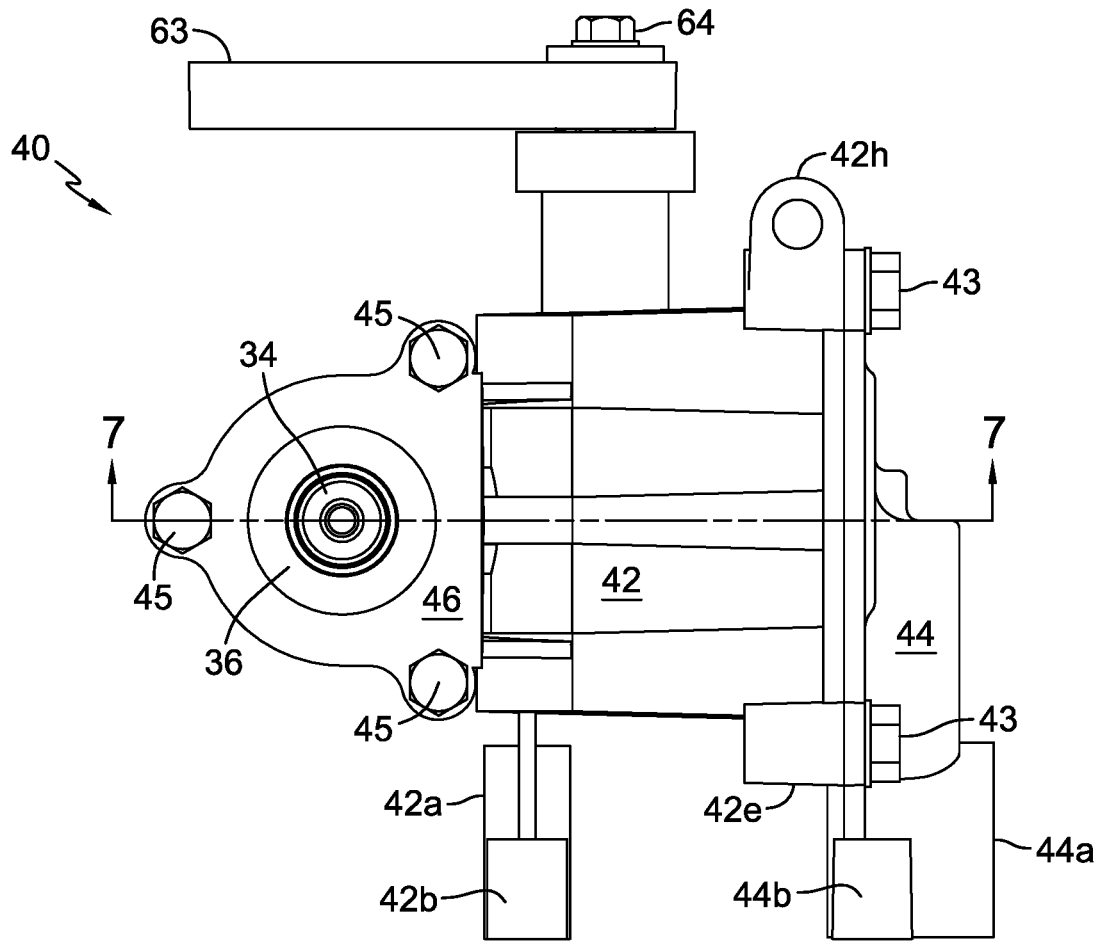
FIG. 6 is a plan view of a pump assembly of FIG. 5.
Figure 8:
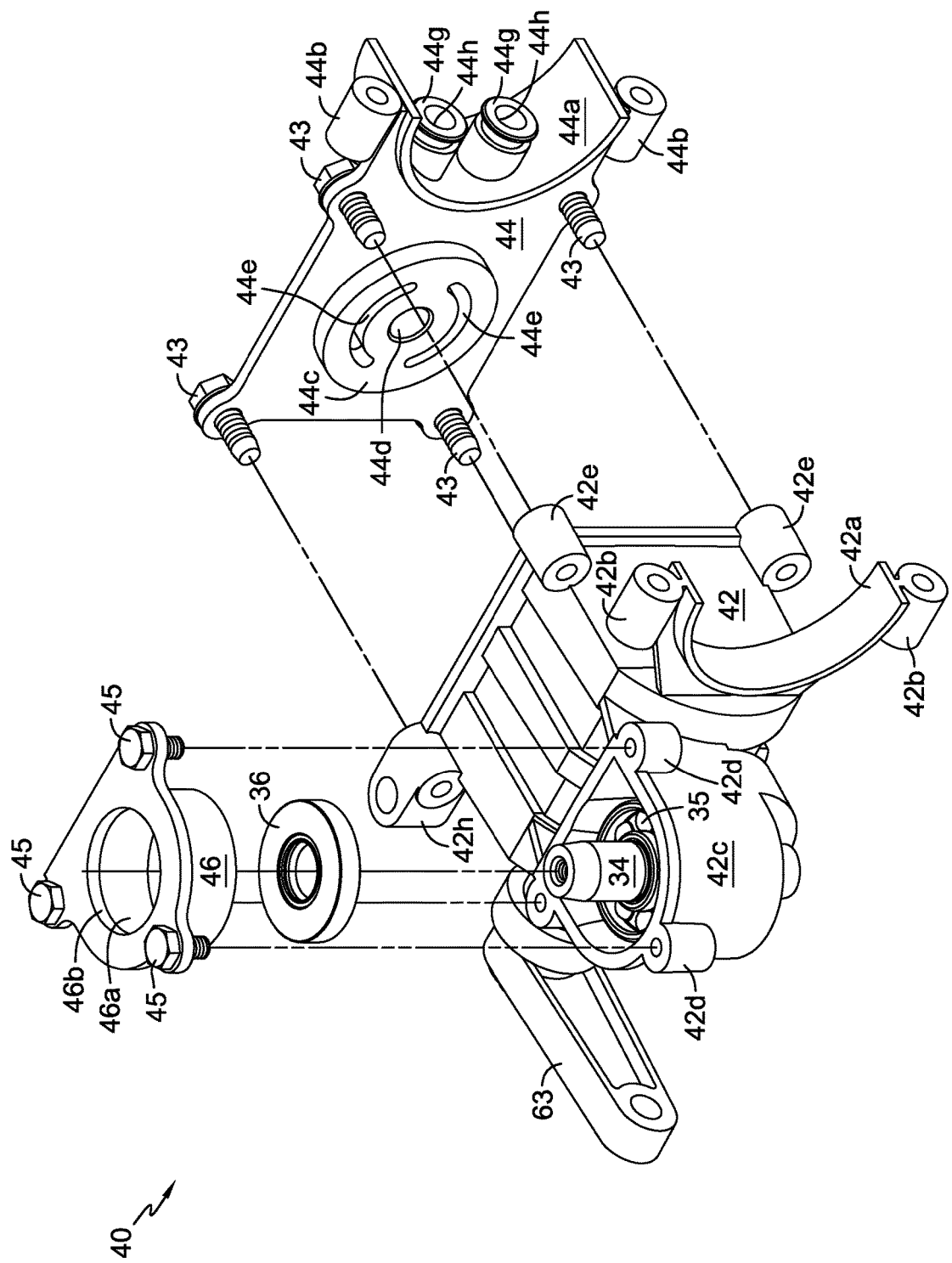
FIG. 8 is a partially exploded perspective view of the pump assembly of FIG. 6.
Figure 19:
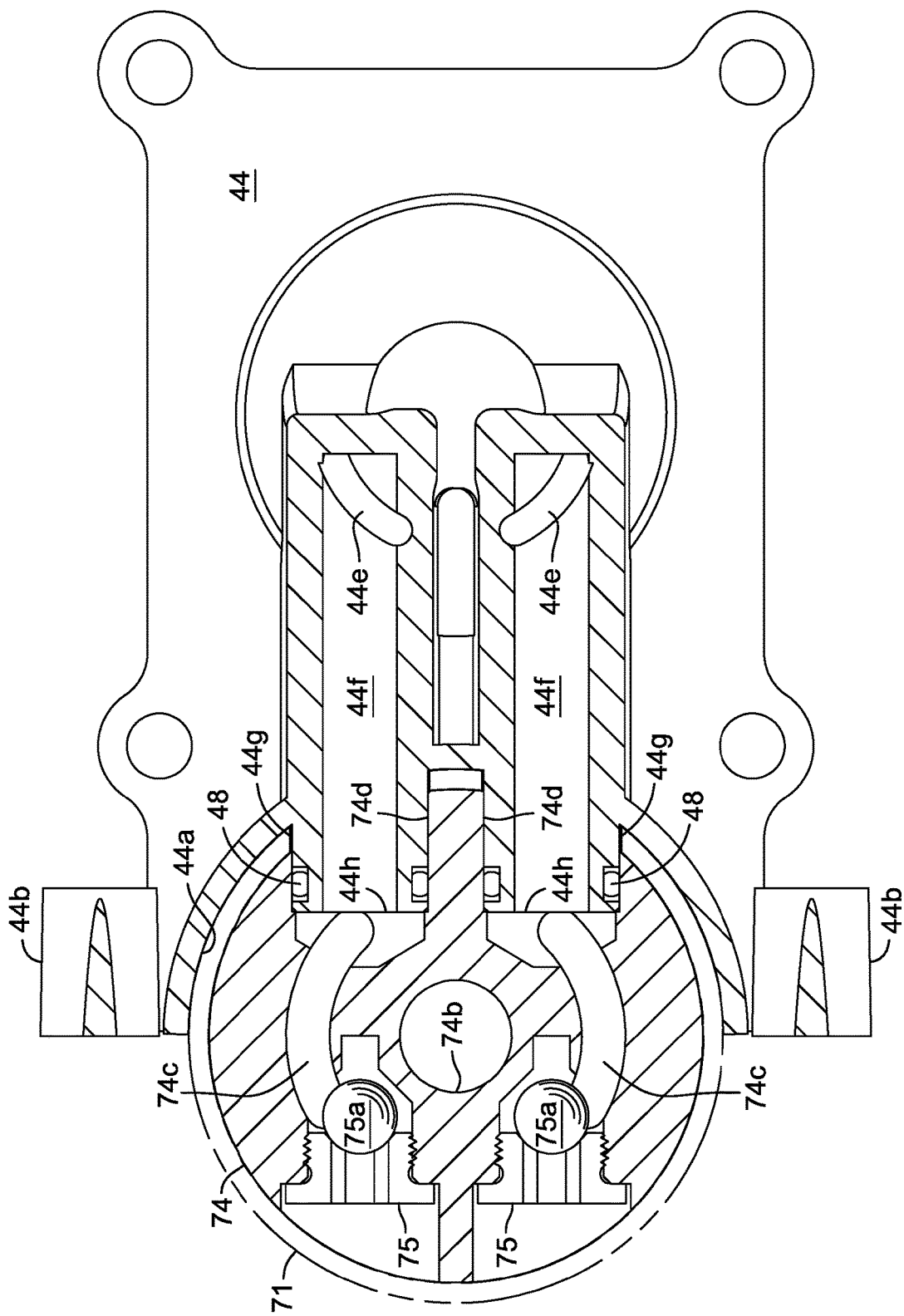
FIG. 19 is a cross-sectional view of the pump end cap and motor port block of FIG. 18 along line 19-19, with the axle tube shown in phantom lines.

As shown in, e.g., FIGS. 5, 8 and 19, when pump assembly 40 is attached to motor assembly 70, two protrusions 44g having o-ring seals 48 installed thereon are inserted through two openings 71d formed in axle tube 71 to sealingly engage two openings 74d formed in motor port block 74, which acts as a hydraulic mounting member for motor assembly 70. Two substantially parallel fluid passages 44f formed in pump end cap 44 connect two kidney-shaped fluid ports 44e formed in pump running surface 44c of pump end cap 44 with two openings 44h formed in the two protrusions 44g. When control arm 63 is rotated from a neutral position, hydraulic fluid flows between fluid ports 44e and two kidney-shaped fluid ports 74c formed in motor running surface 74a of motor port block 74 by way of the fluid passages 44f and through openings 44h to provide fluid communication between axial piston pump 50 and axial piston motor 80 in a hydraulic circuit. Two check valves or check plugs 75 having check balls 75a are installed in ports 74e formed in motor port block 74. Check plugs of the type shown are well-known in the art and will not be described in detail herein. The various hydraulic passages formed in pump end cap 44 and motor port block 74, such as fluid passages 44f, may be referred to generically as hydraulic porting. The formation of such hydraulic porting into such a structure is generally well-known in the art and will not be discussed in detail herein.

The designs of axial piston pump 50 and axial piston motor 80 are also well-known in the art and will not be described in detail herein. Transaxles including hydrostatic transmissions employing pump and motor assemblies of this type are described generally in, e.g., commonly-owned U.S. Pat. No. 5,314,387, the terms of which are incorporated herein by reference. "Axial piston pump 50" and "axial piston motor 80" will be referred to herein as simply "pump 50" and "motor 80," respectively.

Referring primarily to FIGS. 1-8, pump assembly 40 will now be described in further detail. The belt-driven input pulley 15 is attached to an input shaft 34 that is drivingly engaged to a first input bevel gear 37. Optionally, with minor modification, input shaft 34 can be driven by a shaft and coupling combination that is either directly or indirectly driven by prime mover 11. Various shaft coupling methods are well known and will not be described in detail herein. The first input bevel gear 37 drives a second input bevel gear 38 disposed on pump shaft 49 adjacent to a thrust washer 47. The input shaft 34 is supported by an input bearing 35 mounted in a bearing cap 46 of gear chamber 42c and by a journal pocket 42i formed in gear chamber 42c. Bearing 35 and input shaft seal 36 are both inserted into cavity 46a formed in bearing cap 46. Cap 46 includes a flange 46b to retain seal 36 and bearing 35. Cap 46 is secured to gear chamber 42c by a plurality of screws 45 or other suitable fasteners that engage bosses 42d formed on gear chamber 42c.

Bevel gear 37 and bevel gear 38 are both located in the internal volume 41 of gear chamber 42c. The internal volume 41 of gear chamber 42c can either be in communication with sump 31, as shown, or sealed from sump 31 so that the input bevel gears can be lubricated by a separate volume of oil or other lubricant, as desired. Isolating the bevel gears in gear chamber 42c reduces contamination of the hydraulic fluid of sump 31 by particles worn from gears. As is known, ball bearings, journal bearings, bushings, etc. can be added to journal pockets and journal openings, if needed, to reduce wear and increase the service life of transaxle 30.

Pump shaft 49 is drivingly engaged to the pump cylinder block 50b rotatably disposed on running surface 44c of pump end cap 44. Pump shaft 49 is rotatably supported by journal pocket 44d formed in pump end cap 44 at one end and by support opening 42f formed in pump housing 42 proximate to its opposite end.

Figure 4:
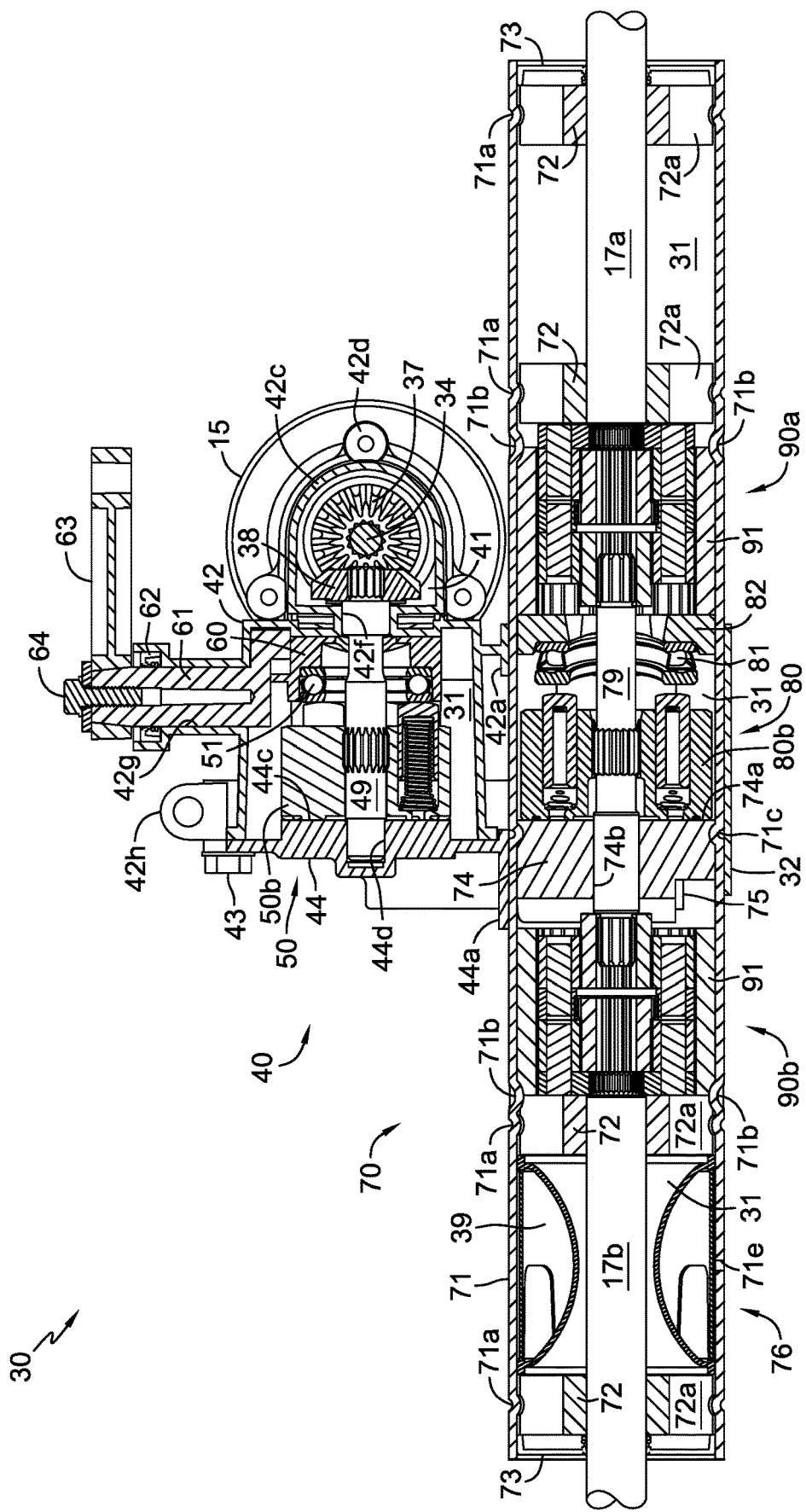
FIG. 4 is a cross-sectional view of the transaxle of FIG. 2 along line 4-4.
Figure 9:
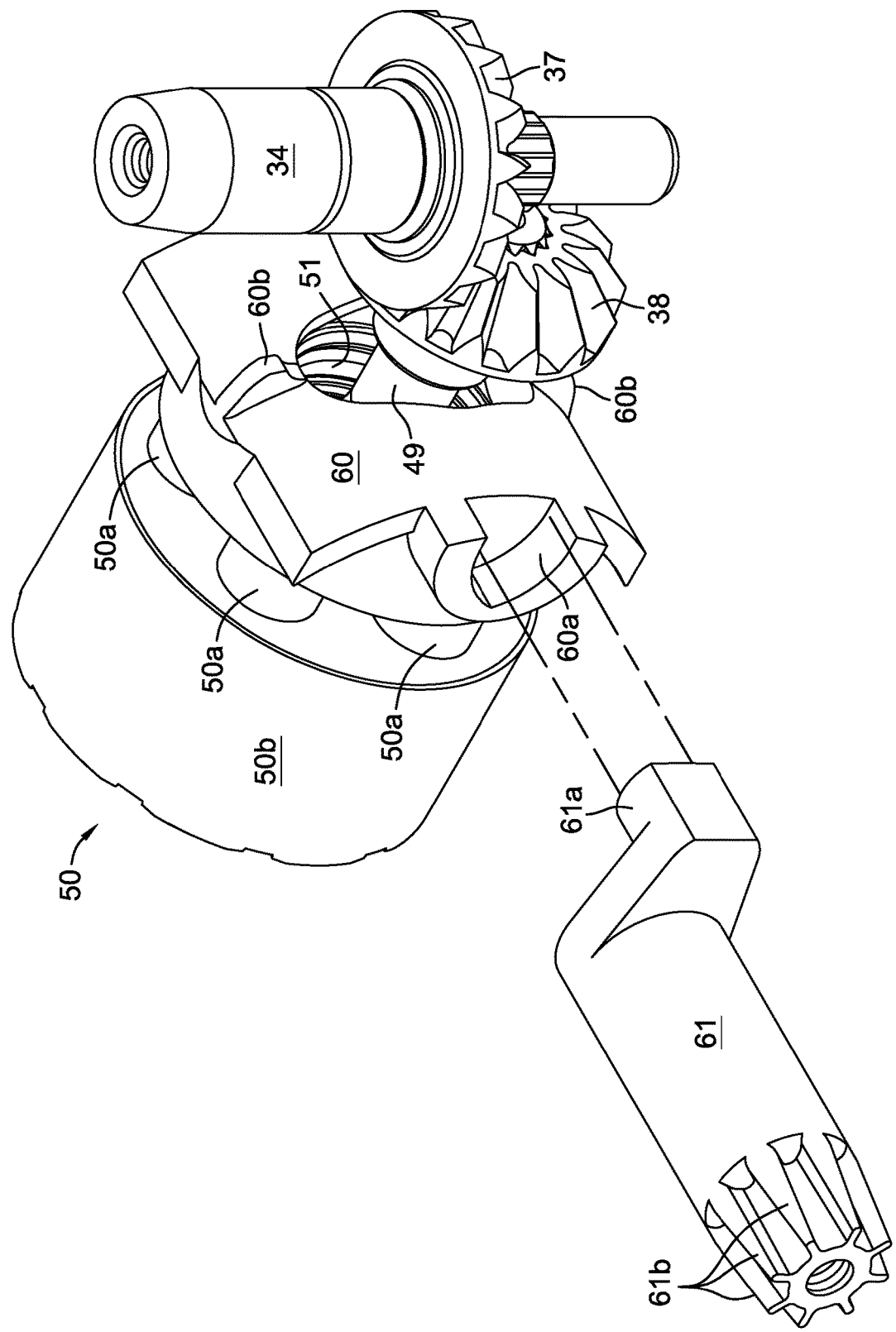
FIG. 9 is a partially exploded perspective view of certain internal components of the pump assembly of FIG. 6.
Figure 10:
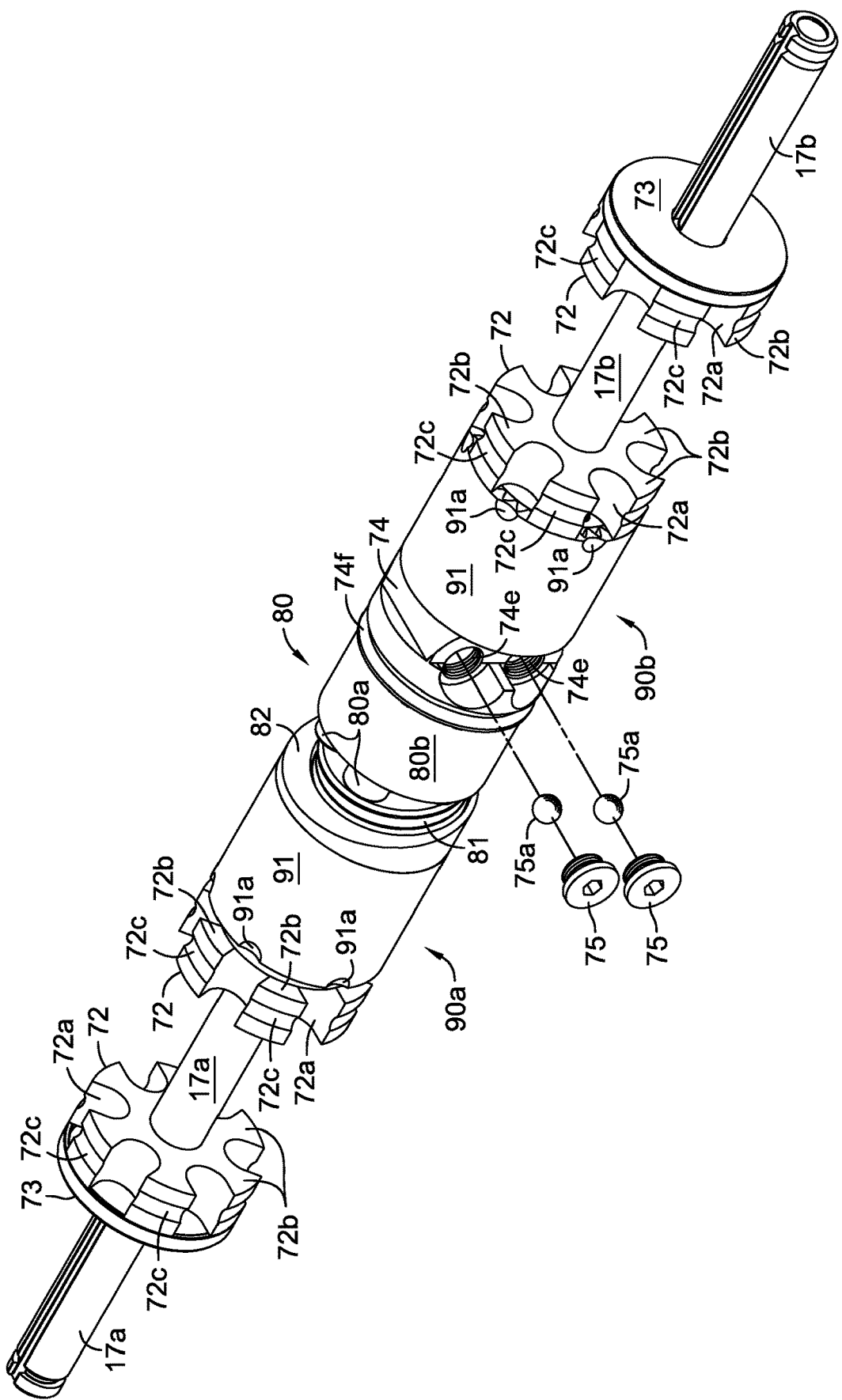
FIG. 10 is a partially exploded perspective view of an axle tube motor assembly of the transaxle of FIG. 5 with certain components, including the axle tube and fluid expansion bladder assembly, removed for clarity.

Referring primarily to FIGS. 4 and 9, the speed and rotational direction of pump 50, and therefore motor 80, is controlled by rotating control arm 63. Control arm 63 is attached to a trunnion arm 61 by means of tapered engagement features 61b, as shown, or alternatively, by means of splines or other known mating features, and a screw 64, as shown, or other suitable fastener. Trunnion arm 61 is rotatably supported in opening 42g formed in pump housing 42. Trunnion arm 61 includes a protrusion 61a that slidingly engages a recess 60a formed in swash plate 60. A plurality of pistons 50a riding in cylinder block 50b of pump 50 are in continuous contact with a thrust bearing 51 that is mounted in a recess formed in the moveable swash plate 60.

Figure 7:
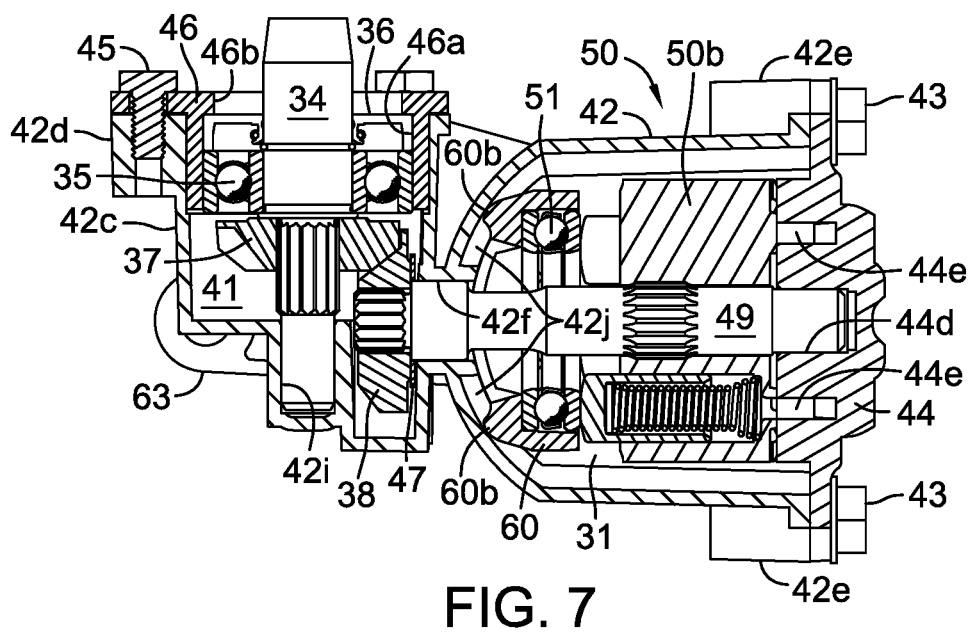
FIG. 7 is a cross-sectional view of the pump assembly of FIG. 6 along line 7-7.

When an operator rotates control arm 63 in a clockwise or counterclockwise direction by means of controls (not shown) and linkages (not shown), swash plate 60 is moved in an arc due to its engagement with protrusion 61a. As shown in FIG. 7, swash plate guide ribs 60b are slidingly engaged with guide slots 42j formed in pump housing 42 to ensure proper arcuate movement of swash plate 60. This arcuate movement of swash plate 60 changes the contact angle between the pistons 50a of pump 50 and thrust bearing 51, thereby providing variable displacement hydraulic output to rotate motor 80 in a corresponding clockwise or counterclockwise direction at various speeds. A swash plate and trunnion arm as shown herein is described in greater detail in commonly-owned U.S. Pat. No. 8,534,060, the disclosure of which is incorporated herein by reference.

Referring primarily to FIGS. 1, 2, 4, 5, 10-13 and 13A, motor assembly 70 will now be described in further detail. Cylinder block 80b of motor 80 is rotatably disposed on running surface 74a of motor port block 74 and is drivingly engaged to motor output shaft 79, which is also referred to as a "motor shaft." Similar to pump 50, a plurality of pistons 80a riding in cylinder block 80b of motor 80 are in continuous contact with a thrust bearing 81. Thrust bearing 81, however, is mounted at a fixed angle on a stationary swash plate 82 so that motor 80 is a fixed displacement motor.

Figure 11:
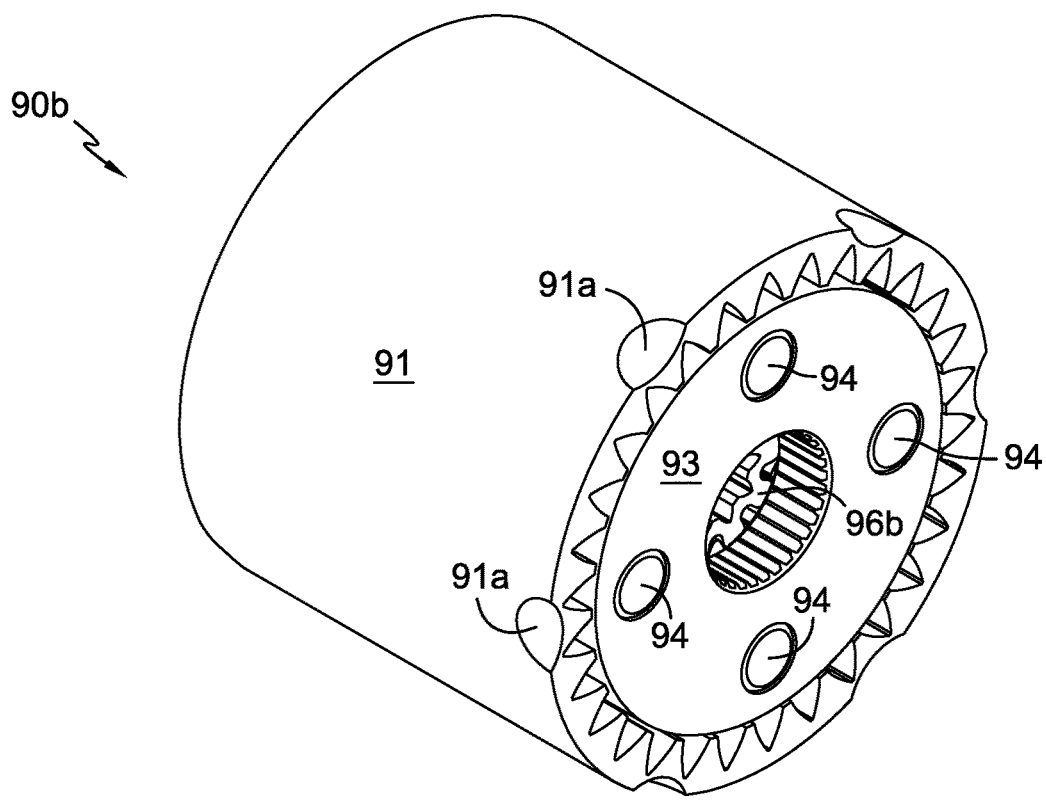
FIG. 11 is a perspective view of a dual-planetary gear reduction mechanism of the axle tube motor assembly of FIG. 10.
Figure 12:
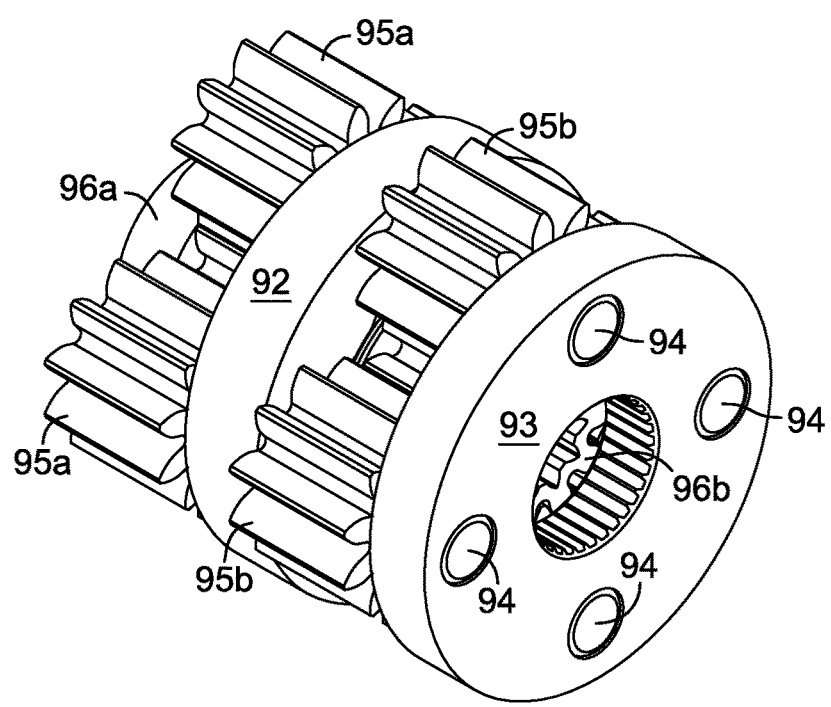
FIG. 12 is a perspective view of the dual-planetary gear reduction mechanism of FIG. 11 with the ring gear removed for clarity.
Figure 13:
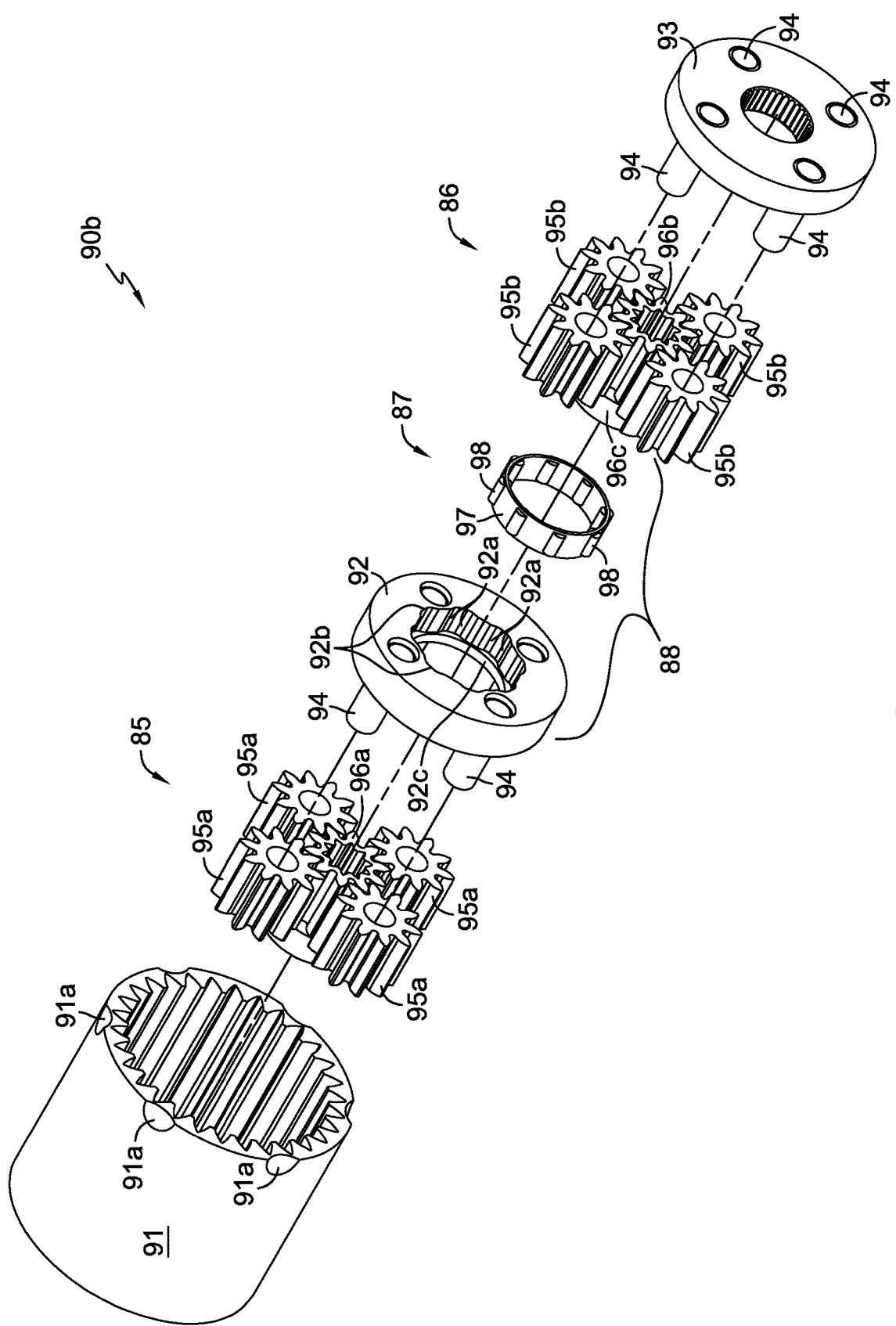
FIG. 13 is a partially exploded perspective view of the dual-planetary gear reduction mechanism of FIG. 11.

One aspect of the invention is the use of two separate dual-planetary gear reduction mechanisms engaged to the motor shaft to permit differential capability. As illustrated in, e.g., FIGS. 4, 10-13 and 13A, motor shaft 79 has a longitudinal axis of rotation and is supported by opening 74b formed in motor port block 74 and is drivingly engaged to a first dual-planetary gear reduction mechanism 90a at its first end and to a second dual-planetary gear reduction mechanism 90b at its second end. Each of the first and second gear mechanisms 90a, 90b includes a ring gear 91 and the following elements disposed within that ring gear 91: an inner planetary gear set 85; a roller clutch 88; and an outer planetary gear set 86. FIGS. 11-13 illustrate gear mechanism 90b, which is structurally identical to gear mechanism 90a. The structural and functional discussion of gear mechanism 90b that follows applies equally to gear mechanism 90a. Ring gear 91 has a generally circular cross-section similar to that of motor port block 74 to fit inside of axle tube 71.

Inner planetary gear set 85 includes a sun gear 96a engaged to and driven by an end of motor shaft 79. Sun gear 96a in turn drives a set of planet gears 95a rotatably mounted on pins 94 carried by inner carrier 92. The planet gears 95a, in cooperation with a static ring gear 91, work to rotate inner carrier 92. Roller clutch 88 is disposed between inner planetary gear set 85 and outer planetary gear set 86, and transfers the rotational energy of inner planetary gear set 85 to outer planetary gear set 86 upon engagement. Roller clutch 88 comprises three main elements: a plurality of ramps 92a and high points 92b formed on the inner diameter of inner carrier 92; roller assembly 87 with its plurality of rollers 98 retained in a cage 97; and a roller running surface 96c formed on the sun gear 96b of outer planetary gear set 86. Roller assembly 87 is rotatably disposed on roller running surface 96c, the combination inset within the inner diameter of inner carrier 92. Shoulder 92c is formed on inner carrier 92 to retain the combination axially. Outer planetary gear set 86 concludes with sun gear 96b engaged to a set of planet gears 95b rotatably disposed on pins 94 carried by outer carrier 93.

Figure 13A:
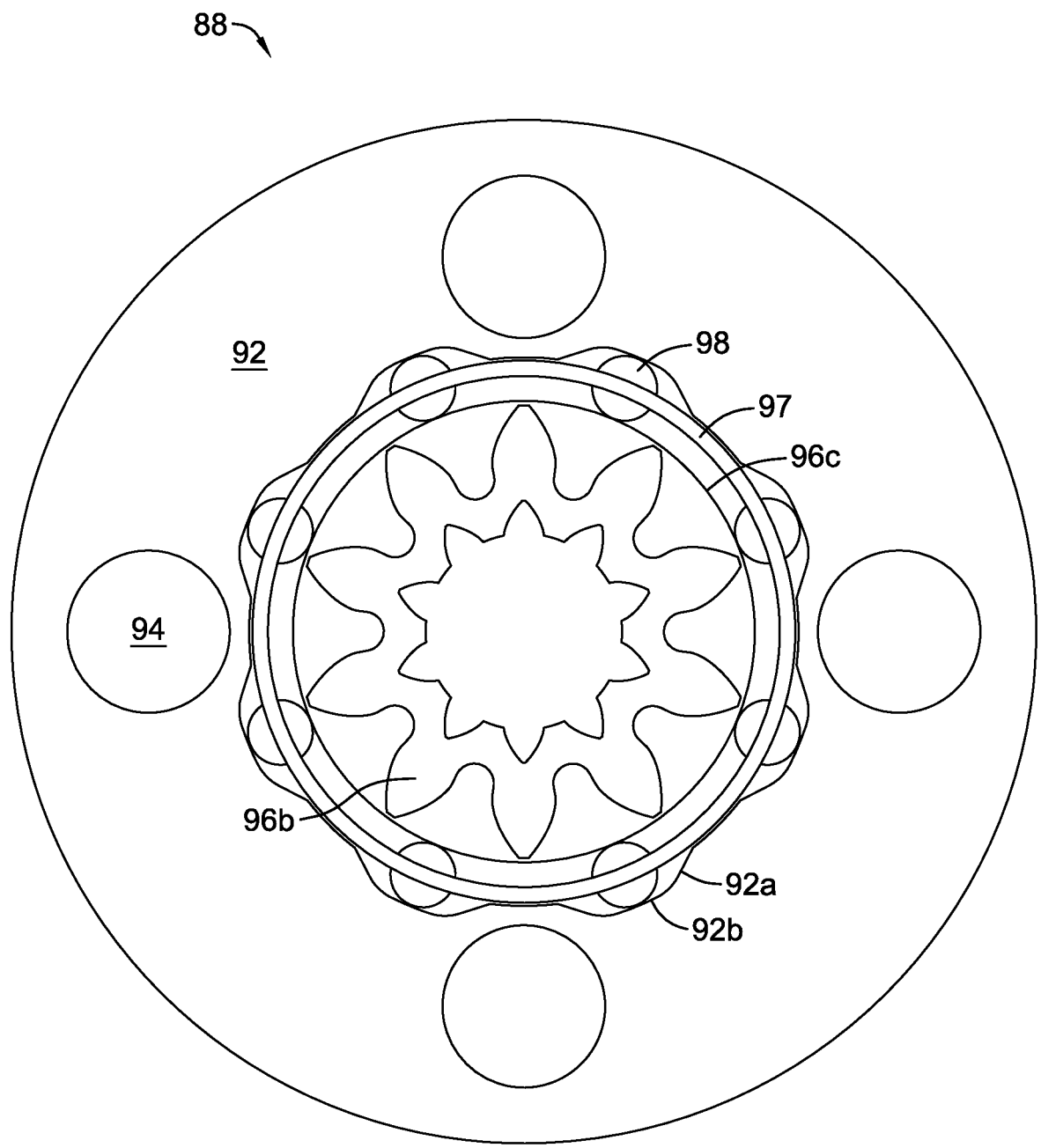
FIG. 13A is an elevational end view of a portion of the roller clutch of the dual-planetary gear reduction mechanism of FIG. 11.

In the disengaged state, as illustrated in FIG. 13A, the rollers 98 of roller assembly 87 are situated adjacent high points 92b within the inner diameter of inner carrier 92 and are free to rotate. Correspondingly, sun gear 96b and the elements thereafter are free to rotate. This disengaged state pertains mainly to the non-driven or neutral condition when motor shaft 79 is not powered. When motor shaft 79 is powered and inner carrier 92 is rotated, the rollers 98 of roller assembly 87 will begin to move away from the high points 92b and travel up the ramps 92a provided nominal resistance to movement is present at the outer carrier 93, such as that provided by the weight of axles 17a, 17b and wheels 18. Owing to the play of rollers 98 within cage 97 and the tolerances established between ramps 92a and roller running surface 96c, rollers 98 become wedged between ramps 92a and running surface 96c to thereby firmly engage and drive sun gear 96b. In this manner, roller clutch 88 achieves engagement, and sun gear 96b drives the planet gears 95b and outer carrier 93. The arrangement of ramps 92a and high points 92b on the inner diameter of inner carrier 92 permits forward and reverse engagement of the roller clutch 88, depending on the direction of rotation of motor shaft 79. The outer carriers 93 of gear mechanisms 90a and 90b are drivingly engaged to one of the axles 17a and 17b, respectively. Thus, a vehicle such as vehicle 10 is propelled. When transaxle 30 is returned to a neutral condition by an operator and inner carrier 92 is no longer under power, roller clutch 88 likewise returns to its disengaged state.

A primary function of the pair of roller clutches 88 in transaxle 30 is to serve as a differential, allowing axles 17a and 17b to be rotated at different speeds. Upon initiation of a turn by the operator of a vehicle such as vehicle 10, the wheel 18 on the larger, outer turning radius is required to rotate a greater number of times than the wheel 18 on the smaller, inner turning radius. With both roller clutches 88 in the engaged state, powering both left and right side wheels 18, the increased speed imparted to the wheel 18 executing the outer turning radius will cause disengagement of its associated roller clutch 88, permitting that wheel 18 to rotate at the increased rate while the wheel 18 on the inner turning radius propels the vehicle. Upon return to straight-line travel, the disengaged clutch will once again engage.

Axles 17a and 17b are each supported by a pair of bearings 72 having one or more fluid-flow openings 72a that allow hydraulic fluid circulation in sump 31 and lubrication of axle seal 73 located at each end of axle tube 71.

One aspect of the invention is the use of a simplified means for retaining the various components within the axle tube. As illustrated, motor port block 74, gear mechanisms 90a/90b, and bearings 72 can be positioned and retained by upsetting or forming the material of axle tube 71 in crimping and dimpling operations. Bearings 72 are positioned and retained by crimps 71a that engage grooves 72c formed in the lobes 72b of each bearing 72. Gear mechanisms 90a/90b are positioned and retained by a plurality of dimples 71b that engage a corresponding plurality of indentations or recesses 91a formed on ring gears 91 of gear mechanisms 90a/90b. The motor port block 74 is positioned and retained by a crimp 71c that engages a groove 74f formed on motor port block 74. The exact form, size and location of crimps, grooves, dimples, recesses, etc., can be modified as needed. For example, the circumferential crimps 71a shown could be changed to shorter arcuate crimps that engage just a portion of each groove 72c or could be changed to dimples similar to dimples 71b to engage grooves 72c.

As illustrated, transaxle 30 is a sealed unit. Referring to FIG. 4, transaxle 30 includes internal sump 31 formed partially by joining pump housing 42 and pump end cap 44 along a vertical seam by means of a plurality of screws 43 that engage bosses 42e. Known sealing methods, such as an adhesive-sealant or a gasket can be used to seal this seam. Installation of various seals such as input shaft seal 36, trunnion arm seal 62, o-ring seals 48 and axle seals 73 serve to further seal transaxle 30 and help form the boundaries of sump 31. While a single sump 31 is depicted herein, in that the various areas of sump 31 are in fluid communication, this design may be considered to have a first sump formed by the pump housing 42 and a second sump formed by the axle tube 71 (i.e., the housing for the motor).

Figure 14:
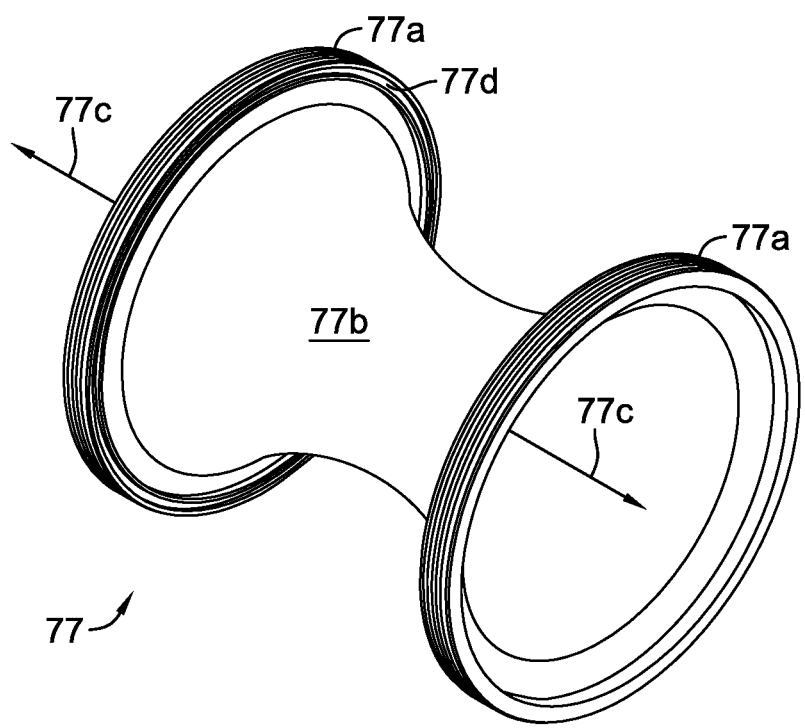
FIG. 14 is a perspective view of a fluid expansion bladder of the transaxle of FIG. 4.
Figure 15:
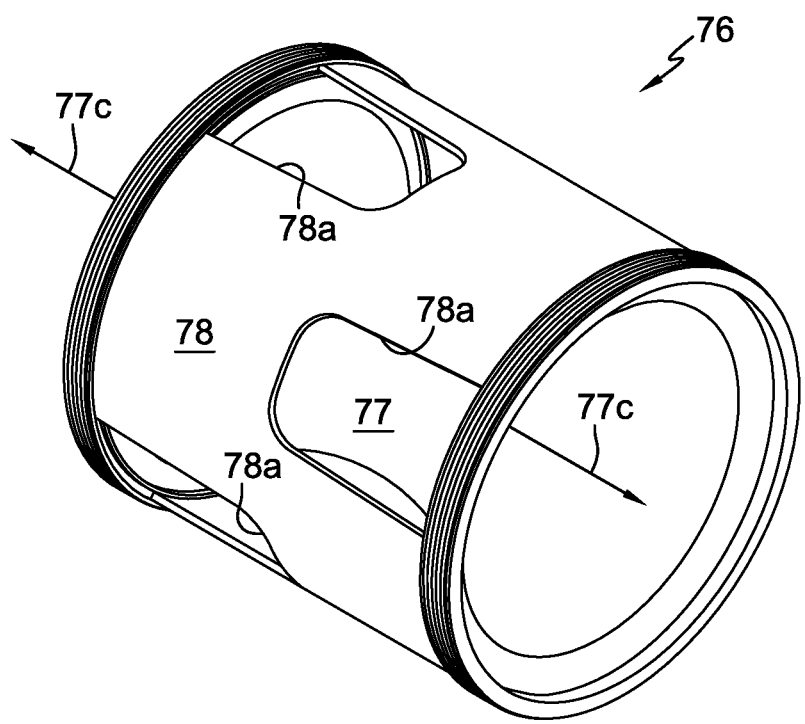
FIG. 15 is a perspective view of a fluid expansion bladder assembly utilizing the fluid expansion bladder of FIG. 14.
Figure 16:
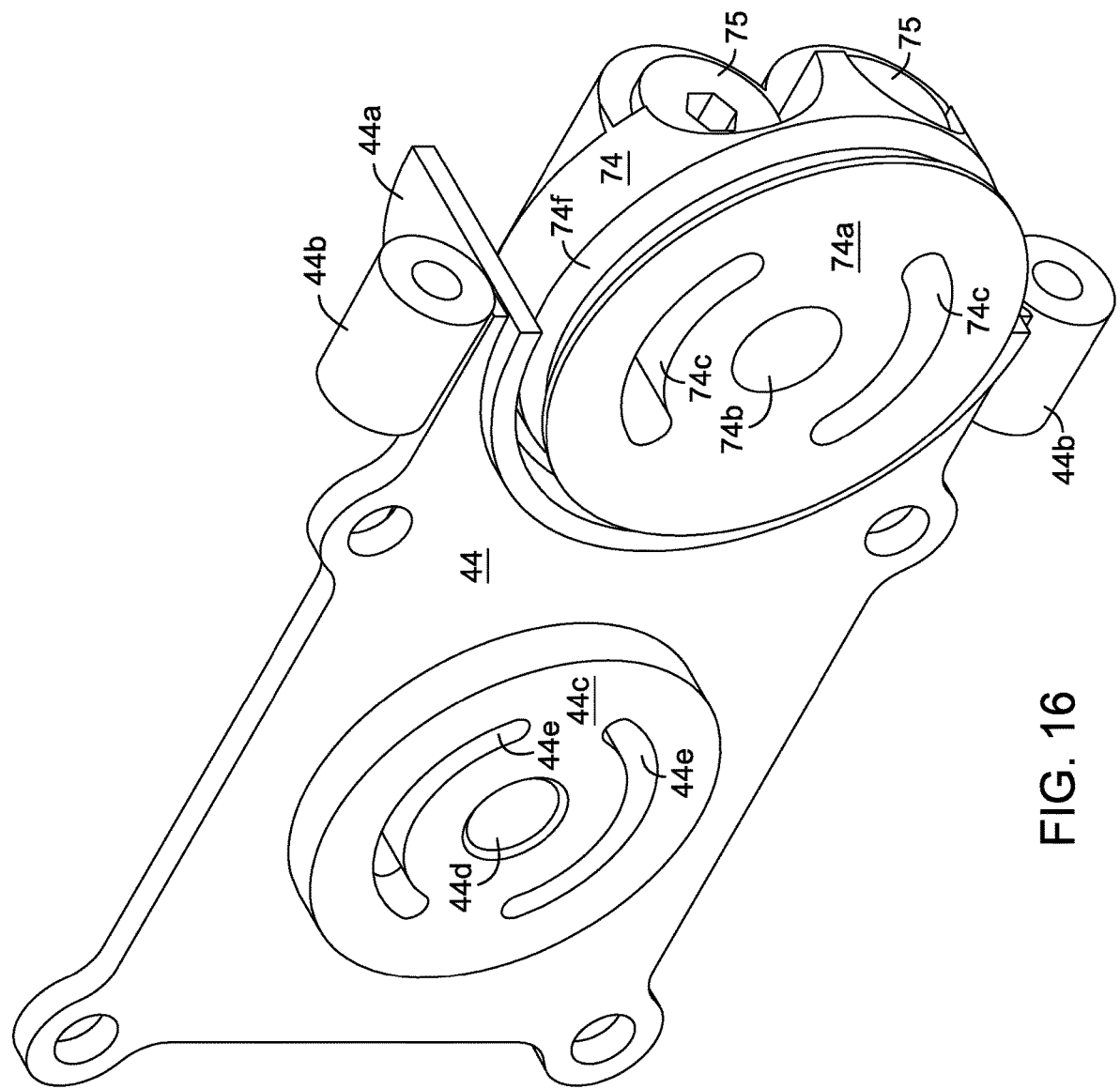
FIG. 16 is a perspective view showing the assembled positions of the pump end cap and motor port block of the transaxle of FIG. 1, with the axle tube removed for clarity.

Referring to FIGS. 4, 14 and 15, an internally mounted fluid expansion bladder assembly 76 is provided to relieve case pressure from transaxle 30 and prevent leakage of hydraulic fluid from sump 31 as the fluid temperature rises and the fluid expands during operation of transaxle 30. Installation of bladder assembly 76 creates an air chamber 39 that accommodates transaxle fluid expansion and is vented to atmosphere by means of at least one opening 71e formed in axle tube 71. Opening 71e as illustrated in FIG. 4 is merely representational; at least one opening 71e is positioned at or near the bottom of axle tube 71. Openings 71e are sized and positioned to allow moisture drainage, air flow in and out of air chamber 39, and can serve as sump fluid leak indicators if visually inspected.

Bladder 77 includes an integrally-formed annular seal 77a at each end of a flexible, tubular membrane 77b having the shape of a hyperboloid. This configuration of bladder 77 allows the hydraulic fluid of sump 31 to pass through the axial opening formed by the tubular membrane 77b along the line 77c in FIGS. 14 and 15. The form of the tubular membrane 77b helps prevent contact between tubular membrane 77b and axle 17b. Each end of a stiff cylindrical sleeve 78 having openings 78a to reduce weight and allow air flow in and out of opening(s) 71e is inserted into an annular groove 77d formed in proximity to each seal 77a. Cylindrical sleeve 78 provides support structure for bladder 77 and proper spacing of seals 77a. Openings 78a can be formed in various quantities, shapes and sizes other than those illustrated, provided cylindrical sleeve 78 has sufficient stiffness to properly support bladder 77 and facilitate ease of installation of bladder assembly 76 into axle tube 71.

Figure 21:
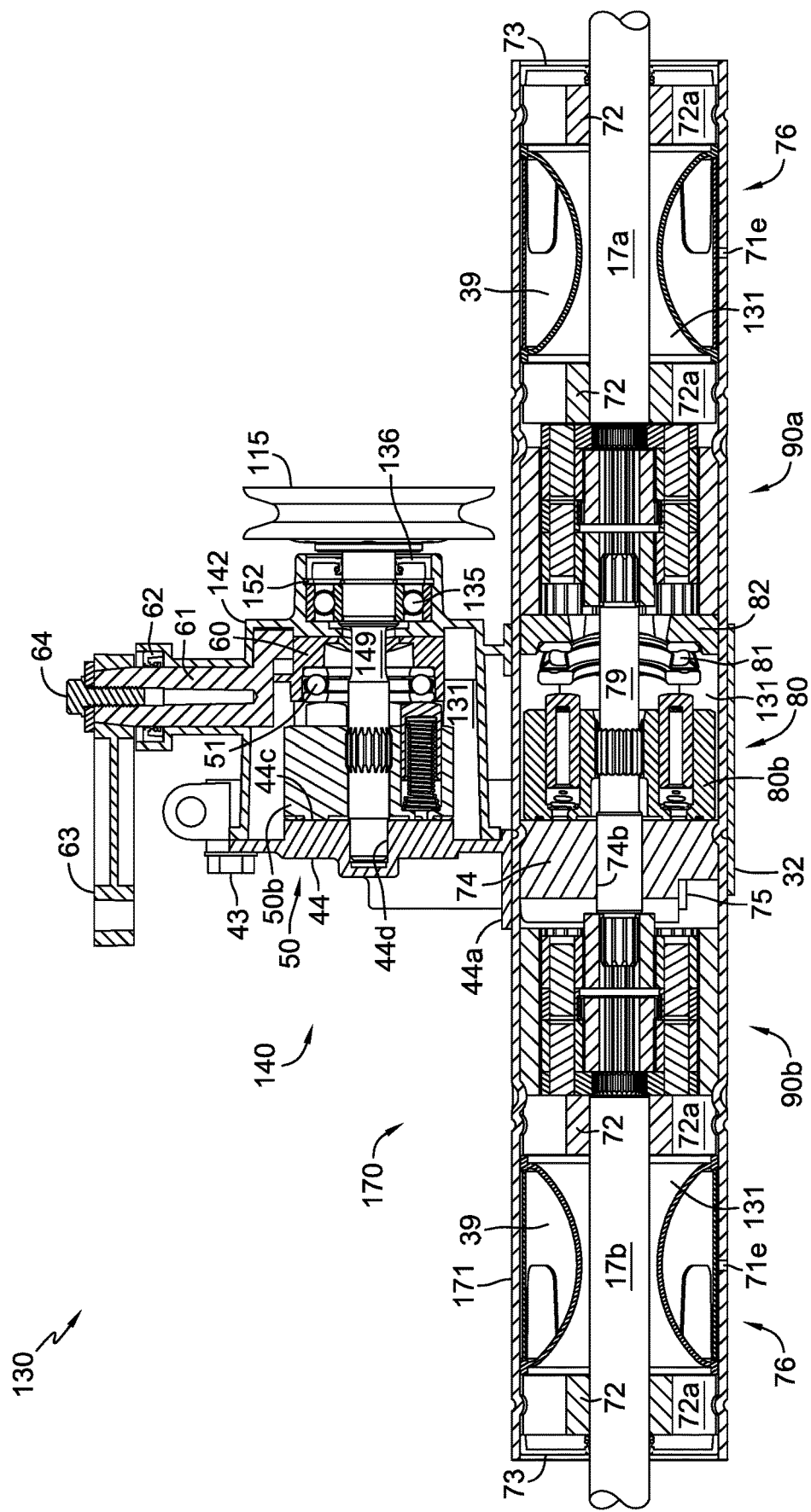
FIG. 21 is a cross-sectional view of the transaxle of FIG. 20 along line 20-20.

Bladder assembly 76 could just as readily be installed in association with axle 17a. Furthermore, if needed for additional case pressure relief, an additional bladder assembly 76 and opening(s) 71e can be added in association with axle 17a, as shown in FIG. 21 in connection with a second embodiment of a transaxle assembly 130. Various other known fluid expansion components, such as a sump vent fitting (not shown) or an external fluid expansion tank (not shown) can be employed in lieu of or in addition to bladder assembly (or assemblies) 76 to relieve case pressure during operation of transaxle 30.

In transaxle 30, the rotational axes of all shafts except the input shaft 34, i.e., the rotational axes of trunnion arm 61, pump shaft 49, motor shaft 79, and axles 17a and 17b, are located on a single plane represented by section line 4-4. The rotational axes of input shaft 34 and pump shaft 49 are both located on another plane, represented by section line 7-7, that is oriented perpendicular to the plane represented by section line 4-4.

Various known hydraulic circuit bypass mechanisms can be applied to transaxle 30 to facilitate manually moving vehicle 10 without opposing hydraulic resistance. This, however, may not be required as it is possible to manually move vehicle 10 when the roller clutches 88 are disengaged. Alternatively, a bypass mechanism may still be desirable in order to move vehicle 10 without inadvertently engaging roller clutches 88 (via jerky or sudden movements when pushing vehicle 10). Additionally, a parking brake, such as a wheel-engagement or tire-engagement brake mechanism may be useful to prevent vehicle 10 from rolling when transaxle 30 is in neutral or very near neutral.

Figure 20:
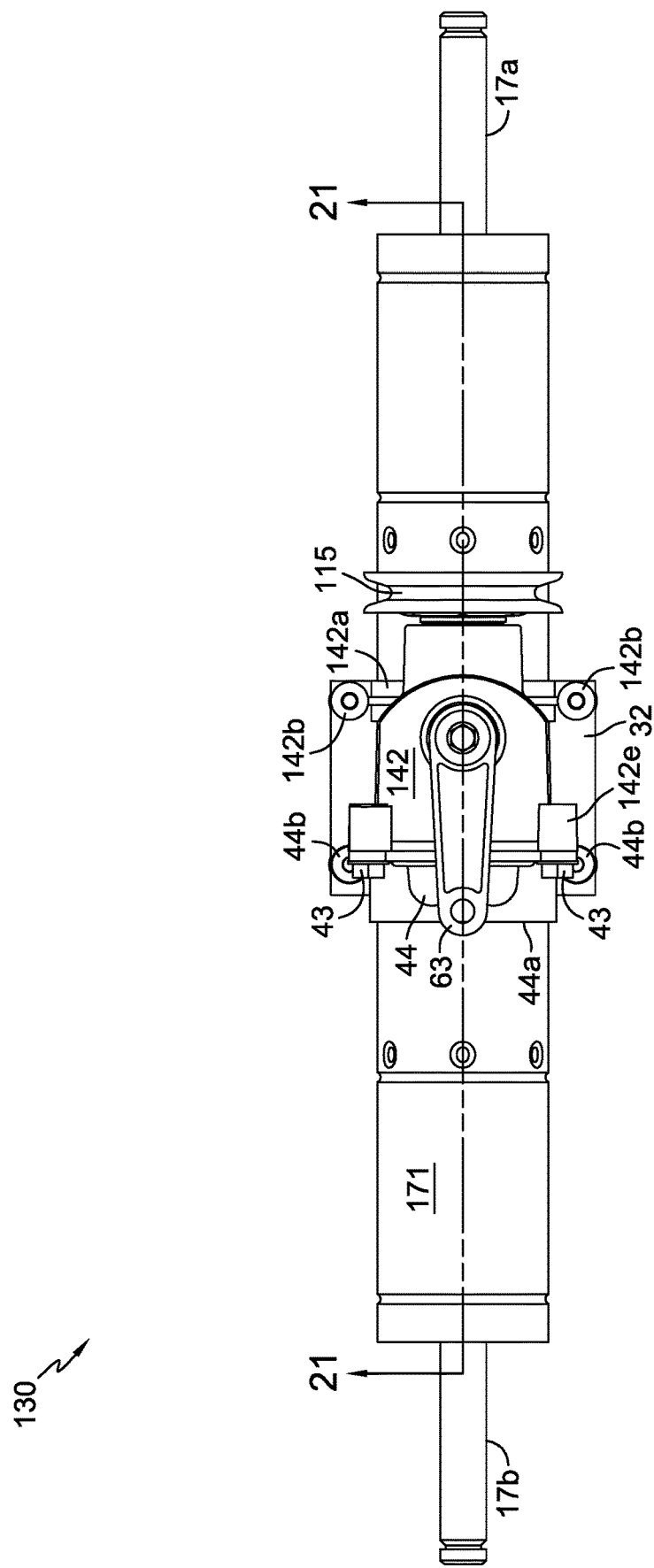
FIG. 20 is an elevational view of a second embodiment of a transaxle in accordance with the present invention.

As illustrated in FIGS. 20 and 21, a second embodiment of a transaxle 130 includes a pump assembly 140 having a horizontally oriented pump input shaft 149 with an attached pulley 115 that is driven by a belt (not shown) that can be oriented vertically or at various other unobstructed angles. The pump housing 142 supports an input bearing 135 that is retained by a retaining ring 152. A shaft seal 136 seals sump 131 and pump input shaft 149. Not present in this embodiment are the input shaft 34, input bevel gears 37 and 38, gear chamber 42c, and other components associated with gear chamber 42c of pump assembly 40.

The rotational axes of all shafts of transaxle 130, including those of trunnion arm 61, pump input shaft 149, motor shaft 79, and axles 17a and 17b, are located on a single plane represented by section line 21-21.

Figure 22:
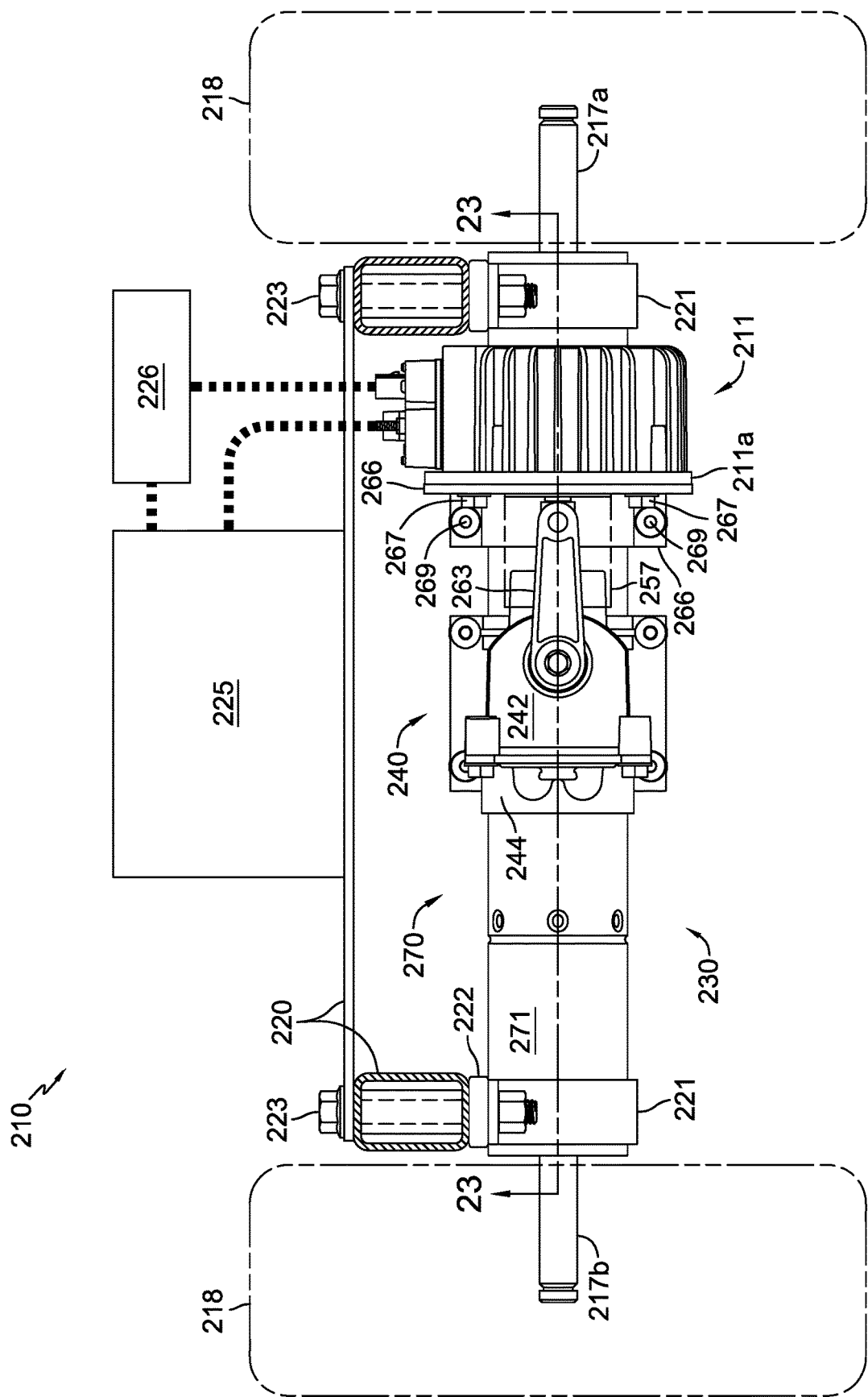
FIG. 22 is an elevational view of a second configuration of a vehicle incorporating a third embodiment of a transaxle in accordance with the present invention.
Figure 23:
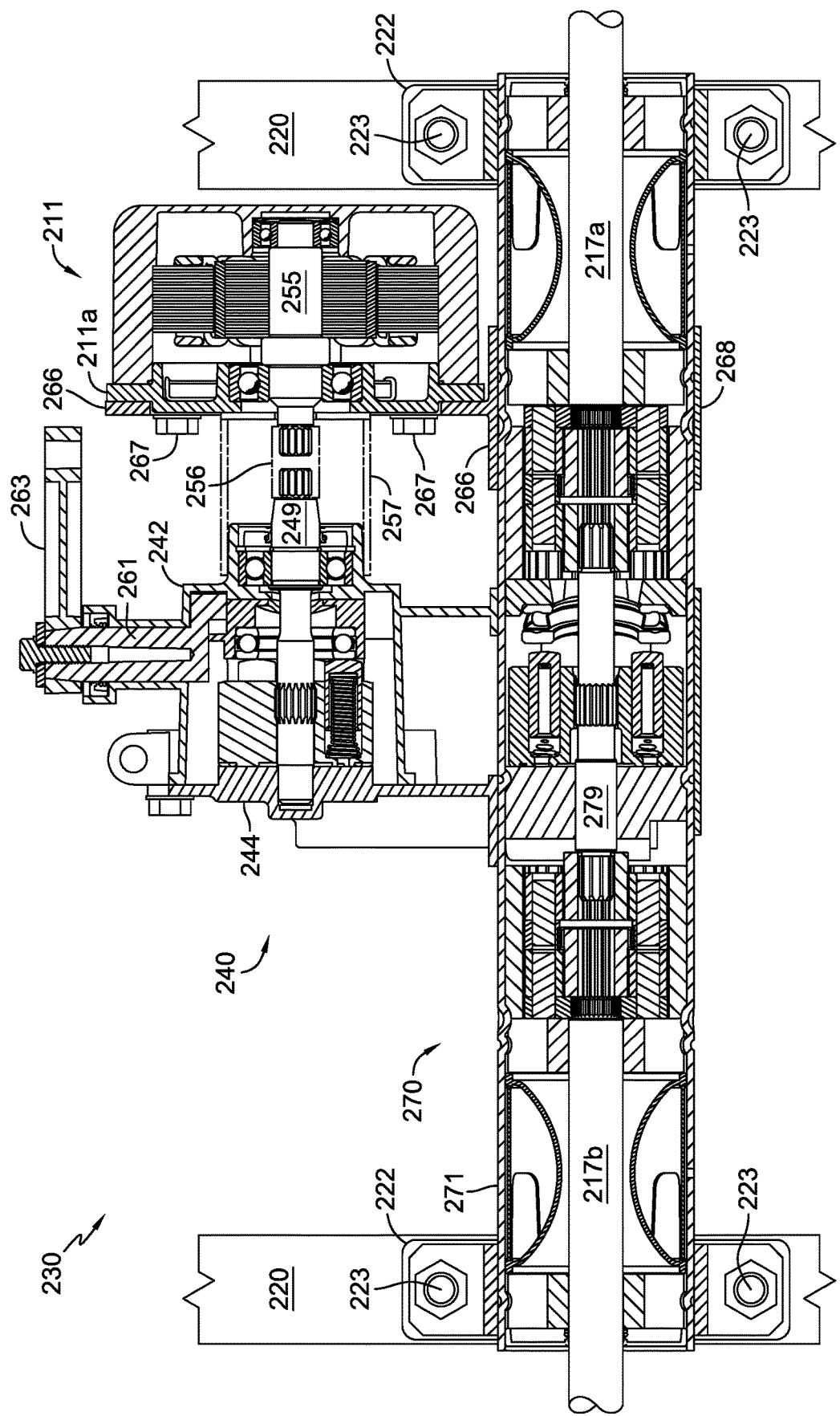
FIG. 23 is a cross-sectional view of the transaxle of FIG. 22 along line 23-23.

As shown in FIGS. 22 and 23, a third embodiment of an electric transaxle 230 includes a pump assembly 240 having a horizontally oriented pump input shaft 249 that is directly driven by an output shaft 255 of an electric motor 211 via coupling 256 that is depicted generically with phantom lines. Also depicted with phantom lines is a guard 257 provided to shield output shaft 255, input shaft 249, and coupling 256 from excessive contamination and contact with foreign objects or debris.

An electric motor similar to electric motor 211 is described in greater detail in commonly-owned U.S. Pat. No. 8,227,948, the disclosure of which is incorporated herein by reference. The lower housing 211a and output shaft 255 of this embodiment have been modified and shortened in comparison to similar components of the electric motor shown and described in U.S. Pat. No. 8,227,948, so that electric motor 211 has a lower profile to allow transaxle 230 to be applied to smaller vehicles, if desired, and to reduce material requirements. The external end of output shaft 255 is configured to interface with coupling 256, as is the pump input shaft 249. As stated previously herein, various shaft coupling methods are well known and will not be described in detail herein.

Pump assembly 240 includes a pump housing 242 and a pump end cap 244 that are similar to pump housing 142 and pump end cap 44, respectively, but have been modified/extended to provide clearance for mounting the electric motor 211. Electric motor 211 is securely attached to motor assembly 270 in a manner similar to that in which pump assemblies 40, 140 and 240 are attached to motor assemblies 70, 170 and 270, respectively. A tube bracket 266 is attached to the lower housing 211a of the electric motor 211 by means of a plurality of screws 267. Tube bracket 266 is also attached to tube bracket 268 by means of a plurality of screws 269 to secure electric motor 211 to motor assembly 270. Anti-rotation features (not shown) can be employed to prevent slippage of tube brackets 266 and 268 on axle tube 271 and to ensure proper axial alignment of the electric motor shaft 255 with the pump input shaft 249.

The rotational axes of all shafts of transaxle 230, including those of trunnion arm 261, pump input shaft 249, motor shaft 279, axles 217a and 217b, and the electric motor output shaft 255, are located on a single plane represented by section line 23-23, giving transaxle 230 a low height profile.

A second configuration of an exemplary generic vehicle 210 incorporating a transaxle 230 is illustrated in FIG. 22. In a manner similar to that of vehicle 10, transaxle 230 is supported by a pair of generally U-shaped brackets 221, each attached to a vehicle frame 220 by at least two bolts 223 or other suitable fasteners. As shown, vibration dampers 222 can be interposed between brackets 221 and frame 220, if desired, to improve ride characteristics of vehicle 210. Each of the axles 217a, 217b of transaxle 230 drives a wheel 218 of vehicle 210.

Vehicle 210 includes a battery or battery set 225 to provide power to the electric motor 211 of transaxle 230 and a controller 226 to regulate the speed, etc., of electric motor 211. In this embodiment of transaxle 230, the electric motor 211 can be run at a relatively constant high speed to ensure adequate torque to move vehicle 210, the speed and forward/reverse direction of which is hydraulically controlled by rotating control arm 263. Because electric motor 211 can be run at a relatively constant speed with output shaft rotation in just one direction, control of electric motor 211 is simplified, enabling use of a simple, low cost controller 226.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. An assembly for a drive unit comprising:
    a housing comprising an internal surface having one or more first inward protrusions and one or more second inward protrusions;
    a hydraulic mounting member disposed in the housing, the hydraulic mounting member comprising one or more first depressions; and
    a first reduction gear assembly disposed in the housing and driven by a hydraulic unit mounted to the hydraulic mounting member, the first reduction gear assembly comprising one or more second depressions;
    wherein the one or more first inward protrusions are received in the one or more first depressions to retain the hydraulic mounting member in the housing, and the one or more second inward protrusions are received in the one or more second depressions to retain the first reduction gear assembly in the housing.

2. The assembly of claim 1, further comprising:
    a second reduction gear assembly disposed in the housing and driven by the hydraulic unit, the second reduction gear assembly comprising one or more third depressions;
    wherein the housing further comprises one or more third inward protrusions, and the one or more third inward protrusions are received in the one or more third depressions to retain the second reduction gear assembly in the housing.

3. The assembly of claim 2, wherein the first reduction gear assembly drives a first axle and the second reduction gear assembly drives a second axle, and the first axle is collinear with the second axle.

4. The assembly of claim 3, wherein the hydraulic mounting member is a motor port block and the hydraulic unit is a hydraulic motor driving a motor output shaft, and the motor output shaft is collinear with the first axle and the second axle.

5. The assembly of claim 4, further comprising a pump disposed in a separate pump housing, wherein the pump housing is engaged to an external surface of the housing.

6. The assembly of claim 2, further comprising at least one bearing disposed in the housing, the at least one bearing comprising a plurality of bearing depressions, wherein the internal surface of the housing further comprises one or more inward bearing protrusions that are received in the plurality of bearing depressions to retain the at least one bearing in the housing.

7. The assembly of claim 6, wherein the plurality of bearing depressions are a plurality of individual and separated bearing grooves, and the one or more inward bearing protrusions is formed by a continuous crimp disposed about an external surface of the housing.

8. The assembly of claim 1, wherein the one or more first inward protrusions is formed by a crimp disposed about an external surface of the housing, and the one or more first depressions is a groove disposed about a surface of the hydraulic mounting member.

9. The assembly of claim 8, wherein the crimp is disposed about a continuous outer perimeter of the external surface of the housing, and the groove is disposed about a continuous perimeter of the external surface of the hydraulic mounting member.

10. The assembly of claim 1, wherein the one or more second inward protrusions are formed by a plurality of dimples disposed about an external surface of the housing, and the one or more second depressions are a plurality of recesses disposed about a surface of the first reduction gear assembly.

11. The assembly of claim 10, wherein each of the plurality of dimples intersects a continuous outer perimeter of the external surface of the housing, and each of the plurality of recesses intersects a continuous perimeter of the surface of the first reduction gear assembly.

12. An assembly for a drive unit comprising:
    a housing comprising an internal surface having one or more first inward protrusions and one or more second inward protrusions;
    a first reduction gear assembly disposed in the housing and driven by a driven shaft, the first reduction gear assembly comprising one or more first depressions; and
    a first bearing disposed in the housing and comprising a one or more second depressions;
    wherein the one or more first inward protrusions are received in the one or more first depressions to retain the first reduction gear assembly in the housing, and the one or more second inward protrusions are received in the one or more second depressions to retain the first bearing in the housing.

13. The assembly of claim 12, wherein the housing is cylindrical, and the first reduction gear assembly drives a first axle that extends through the first bearing.

14. The assembly of claim 12, wherein the one or more first inward protrusions are a plurality of dimples, and each dimple is recessed into an external surface of the housing in a direction perpendicular to a major longitudinal axis of the housing.

15. The assembly of claim 14, wherein the one or more second inward protrusions are formed by a crimp extending around the external surface of the housing, and the one or more second depressions are a plurality of individual and separated grooves.

16. The assembly of claim 15, wherein the first bearing comprises a plurality of fluid flow openings, and the plurality of individual and separated grooves are separated by the plurality of fluid flow openings.

17. The assembly of claim 12, wherein the first reduction gear assembly is retained in the housing without fasteners extending from the housing into the first reduction gear assembly and without fasteners extending from the housing into the first reduction gear assembly.

18. The assembly of claim 12, further comprising:
a second reduction gear assembly disposed in the housing and engaged to the driven shaft, the second reduction gear assembly comprising one or more third depressions;
a second axle engaged to and driven by the second reduction gear assembly;
a second bearing disposed in the housing and comprising one or more fourth depressions, wherein the second axle extends through the second bearing;
wherein the internal surface of the housing comprises one or more third inward protrusions received in the one or more third depressions and one or more fourth inward protrusions received in the one or more fourth depressions.

19. An assembly for a drive unit comprising:
a housing comprising an internal surface having one or more first inward protrusions, one or more second inward protrusions, and one or more third inward protrusions;
a hydraulic mounting member disposed in the housing, the hydraulic mounting member comprising one or more first depressions;
a hydraulic motor rotatably disposed on the hydraulic mounting member and driving a motor output shaft;
a reduction gear assembly disposed in the housing and driven by the motor output shaft, the reduction gear assembly comprising one or more second depressions; and
a bearing disposed in the housing and comprising one or more third depressions, and an output axle driven by the reduction gear assembly and extending through the bearing;
wherein the one or more first inward protrusions are received in the one or more first depressions to retain the hydraulic mounting member in the housing, the one or more second inward protrusions are received in the one or more second depressions to retain the reduction gear assembly in the housing, and the one or more third inward protrusions are received in the one or more third depressions to retain the bearing in the housing.

20. The assembly of claim 19, wherein at least one of the first, second, and third inward protrusions is a continuous crimp extending about an outer perimeter of an external surface of the housing, and at least one of the first, second, and third depressions is a continuous groove.

\* \* \* \* \*